INVENTORS
KENNETH A. BROWNE
BY JAMES FREDERICK NORTON
ATTORNEYS

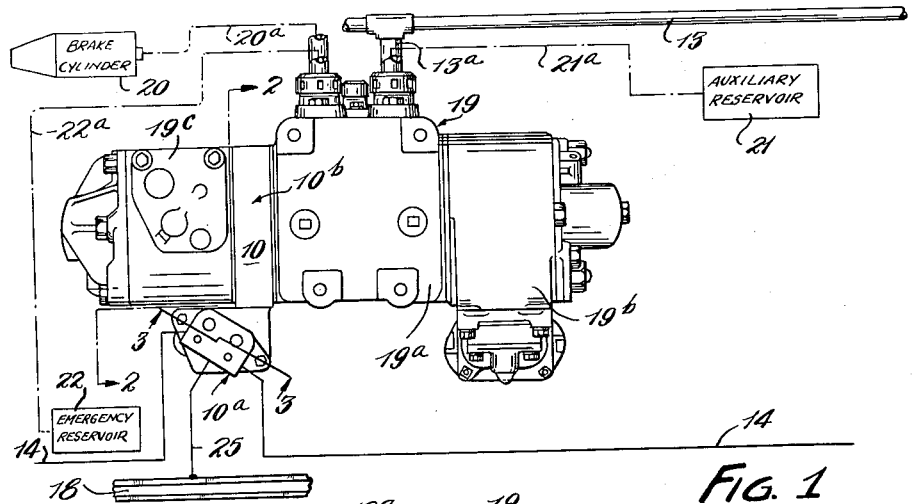

July 18, 1961  K. A. BROWNE ET AL  2,993,199
TRAIN INSPECTION APPARATUS
Original Filed Dec. 29, 1950  7 Sheets-Sheet 3

INVENTORS
KENNETH A. BROWNE
BY JAMES FREDERICK NORTON
Hudson, Broughton,
Williams, David & Hoffmann
ATTORNEYS

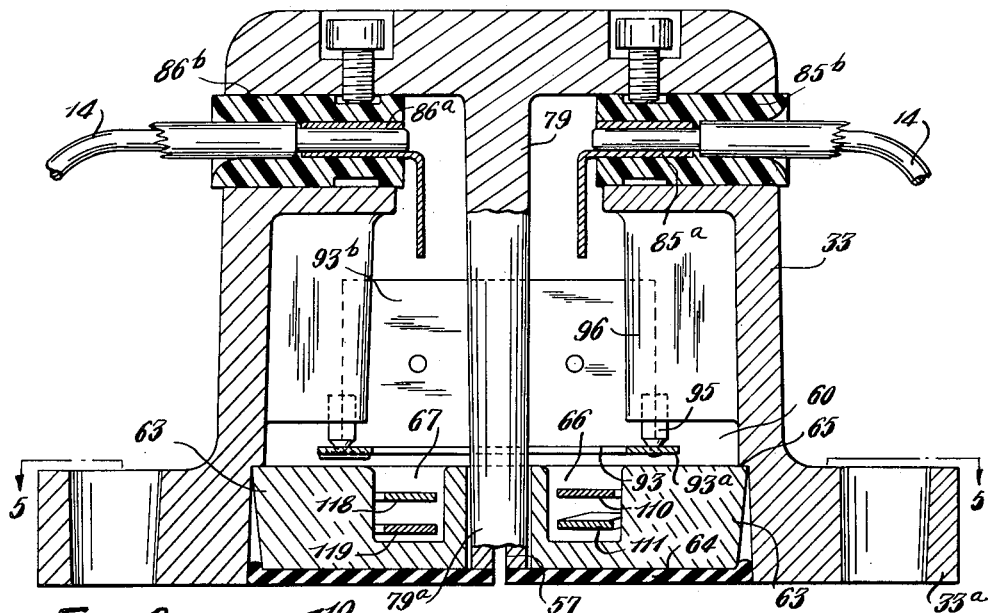
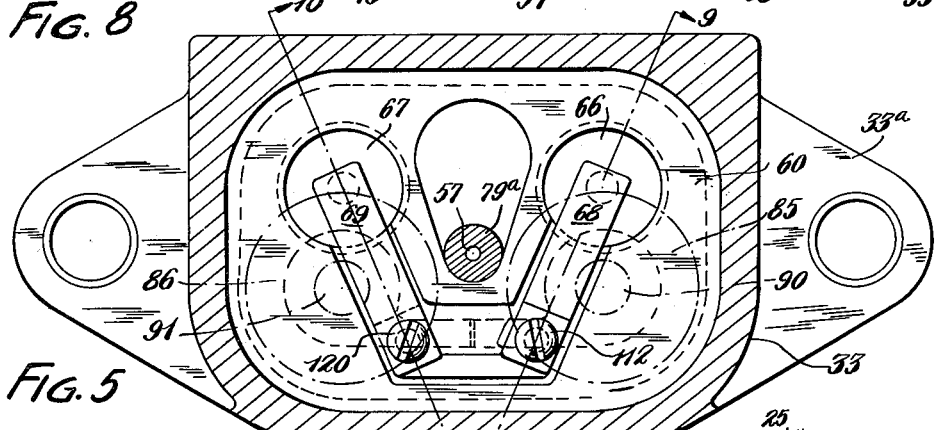
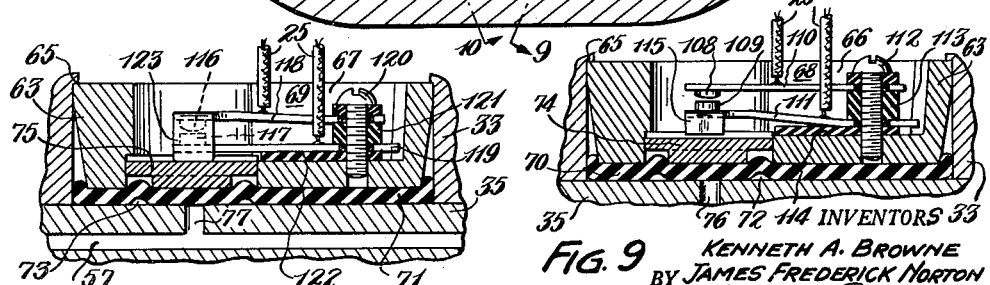

July 18, 1961 K. A. BROWNE ET AL 2,993,199
TRAIN INSPECTION APPARATUS
Original Filed Dec. 29, 1950 7 Sheets-Sheet 5
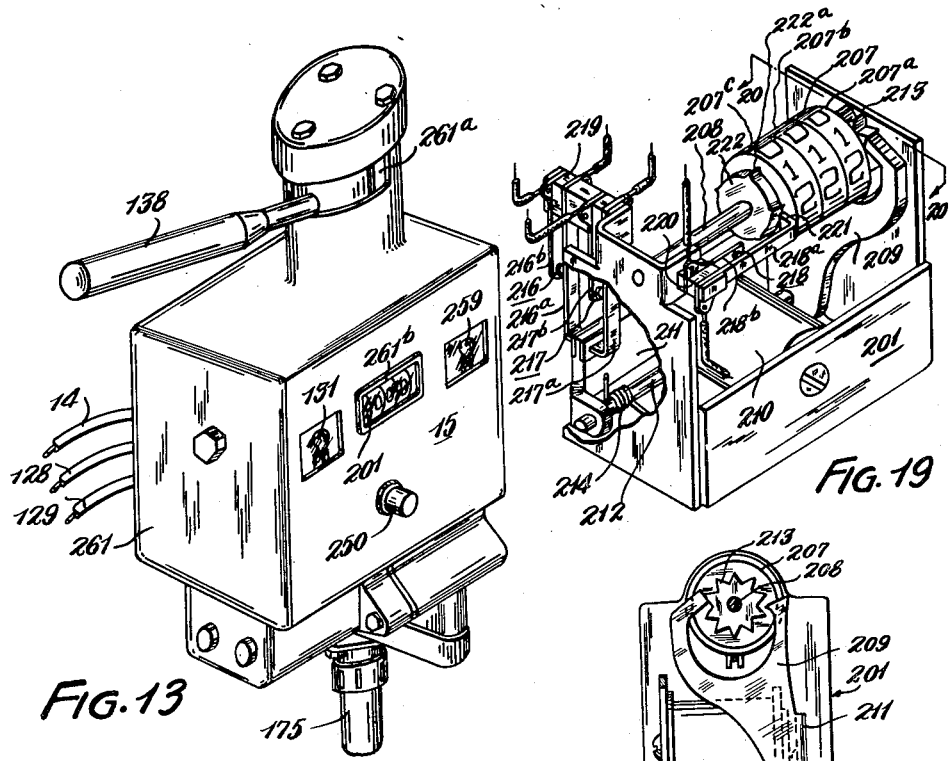
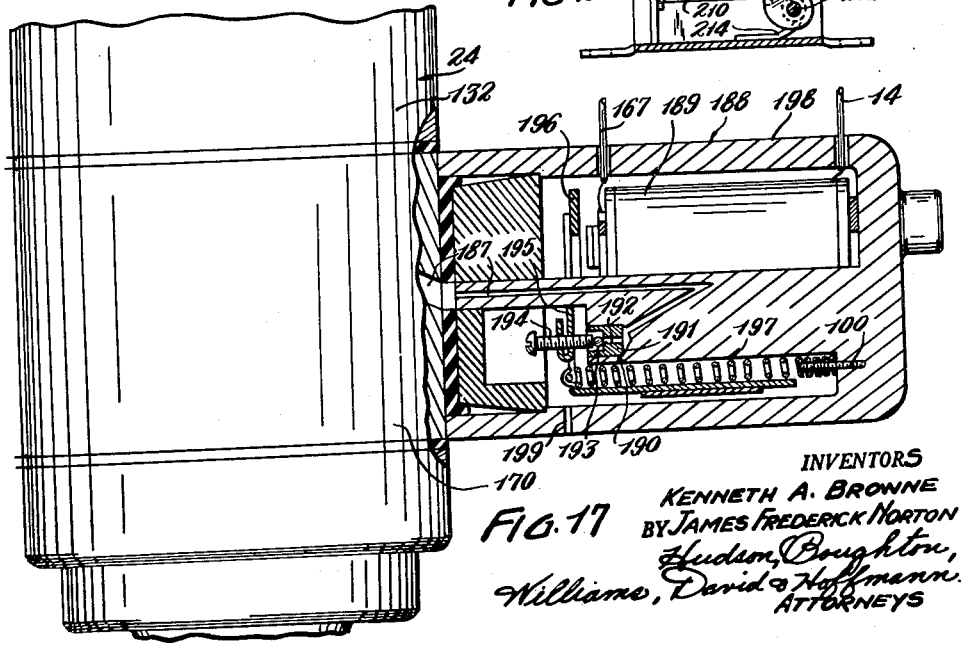
INVENTORS
KENNETH A. BROWNE
BY JAMES FREDERICK NORTON
Hudson, Boughton,
Williams, David & Hoffmann.
ATTORNEYS July 18, 1961 K. A. BROWNE ET AL 2,993,199
TRAIN INSPECTION APPARATUS
Original Filed Dec. 29, 1950 7 Sheets-Sheet 6
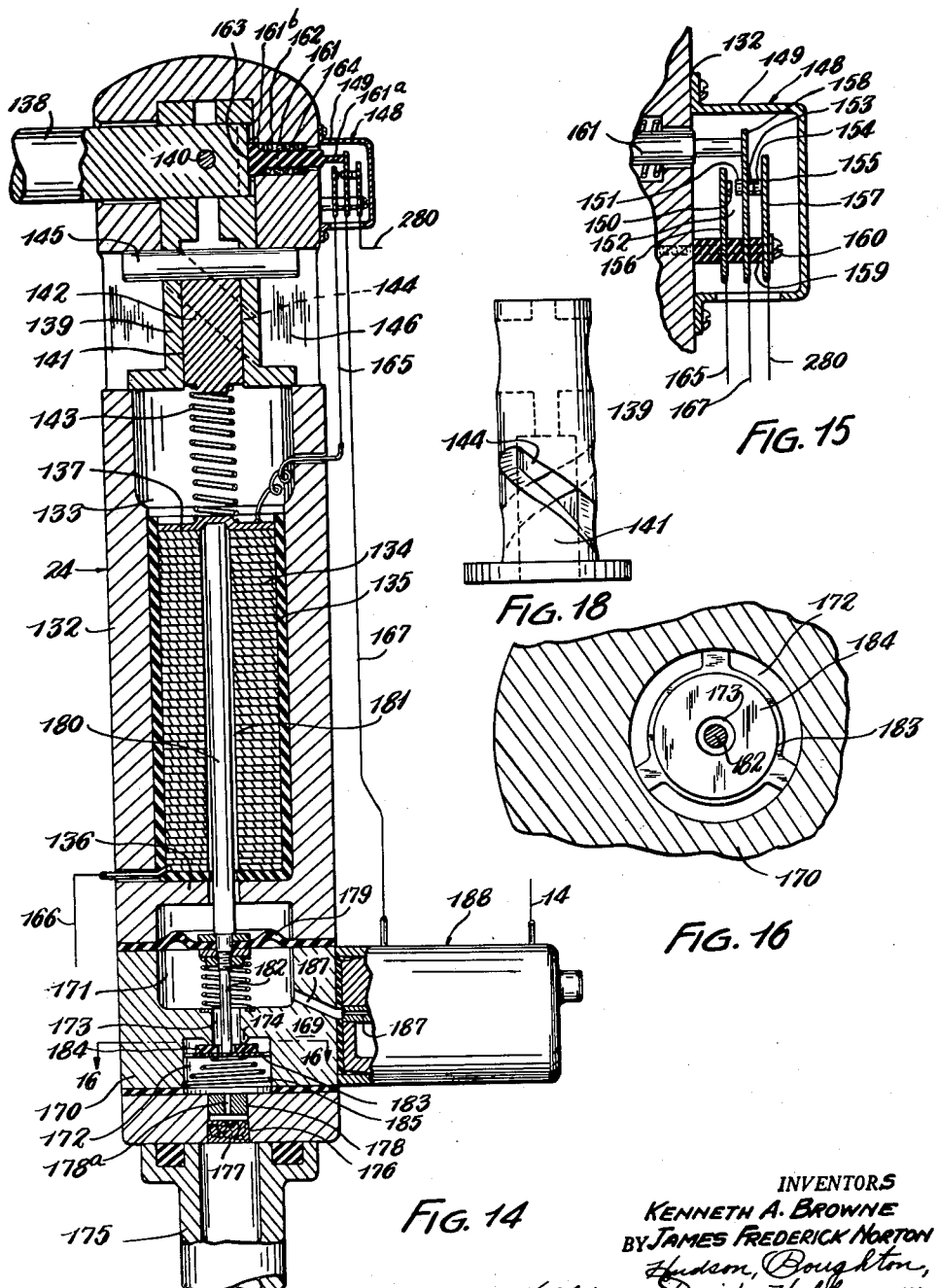
INVENTORS
KENNETH A. BROWNE
BY JAMES FREDERICK NORTON
Hudson, Boughton,
Williams, David & Hoffmann.
ATTORNEYS

United States Patent Office 2,993,199
Patented July 18, 1961

2,993,199
TRAIN INSPECTION APPARATUS
Kenneth A. Browne, Lakewood, and James Frederick Norton, Berea, Ohio, assignors to The Chesapeake and Ohio Railway Company, Cleveland, Ohio, a corporation of Viriginia
Original application Dec. 29, 1950, Ser. No. 203,499. Divided and this application Apr. 8, 1957, Ser. No. 651,487
9 Claims. (Cl. 340—213)

This invention relates to apparatus for checking the operativeness of the air brake mechanisms of individual cars of a railway train. This application is a division of original application Serial No. 203,499, filed December 29, 1950, now Patent No. 2,810,610, granted October 22, 1957.

An object of this invention is to provide novel inspection apparatus by which the operativeness of the air brake mechanisms of individual cars of a railway train can be readily checked and by which the number and locations of faulty or non-functioning brake mechanisms can be quickly determined, such that the handling of railway cars and trains can be carried out with less time and work on the part of train crews and yard personnel.

Another object is to provide such inspection apparatus which will be capable of an automatic functioning initiated from a control point located either on the locomotive or at a yard charging station, and which will not interfere with the conventional service and emergency functioning of the pneumatic train brake system in response to brake pipe pressure reductions produced in the customary way.

A further object is to provide such inspection apparatus which is electrical in character and can be incorporated in air brake mechanism in the initial construction thereof or can be applied thereto as an adapter means, and which inspection apparatus will provide a supplementary electrical control means for controlling train brakes in a highly satisfactory manner and independently of the usual engineers brake valve.

Still another object is to provide novel inspection and car counting apparatus for railway use in conjunction with a pneumatic brake system and which comprises electric impulse producing means located on the cars and responsive to the functioning of the brake mechanisms thereof, and an impulse responsive indicating means located on the control vehicle or locomotive.

Yet another object is to provide novel apparatus of the kind above referred to which is applicable to control valve mechanisms of the conventional triple-valve type, such as the so-called "AB" control valves, and in which the inspection and car counting function and the supplementary brake control function involve the use of novel valve and switch means.

As still another object thereof, this invention provides novel air brake inspection apparatus of the character above indicated in which a control circuit extends through the individual cars and in which switch devices, contained in the control circuit and responsive to the functioning of the brake mechanisms, control the impulse producing means.

Additionally this invention provides such a novel brake inspection apparatus which includes electromagnetic valve devices on the individual cars and associated with the brake mechanisms thereof, and in which the electric impulses are produced by the electromagnets of such electromagnetic valve devices, and wherein the impulse responsive indicating means of the locomotive includes a counting device and novel means for resetting the counting device.

Other objects and advantages of this invention will be apparent in the following detailed description and in the accompanying sheets of drawings forming a part of this specification and wherein—

FIG. 1 is a top plan view somewhat diagrammatic in form and showing air brake apparatus embodying the present invention and in which a valve and switch unit in the form of an adapter is applied to a control valve mechanism of the AB type;

FIG. 2 is a transverse section taken through the control valve mechanism of FIG. 1, the view being taken substantially on section line 2—2 of FIG. 1 and showing the adapter unit with portions thereof broken away;

FIG. 5 is another transverse section taken through the adapter unit substantially as indicated by section line 5—5 of FIGS. 3 and 8;

Figure 3:
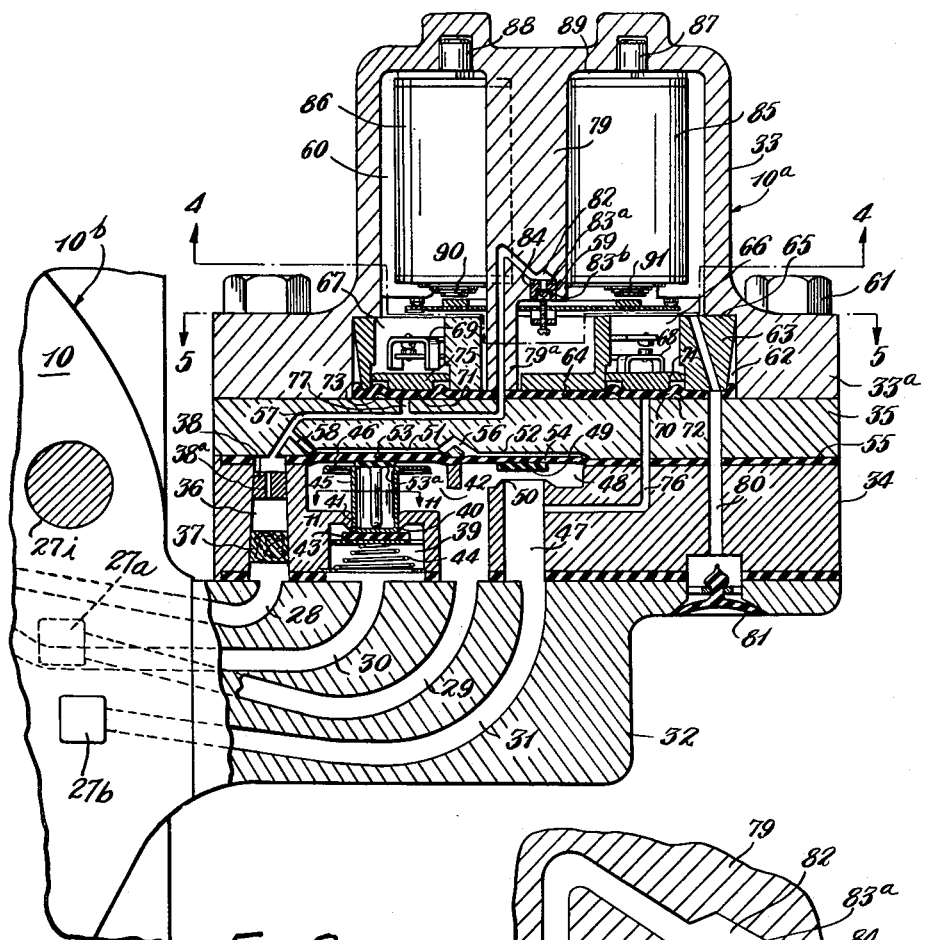
FIG. 3 is a larger scale vertical section taken through the adapter unit approximately as indicated by the irregular section line 3—3 of FIG. 1.
Figure 11:
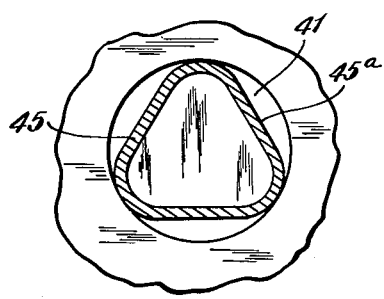
Figure 12:
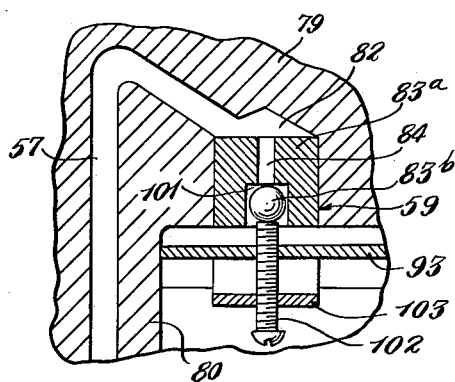
Figures 6, 7:
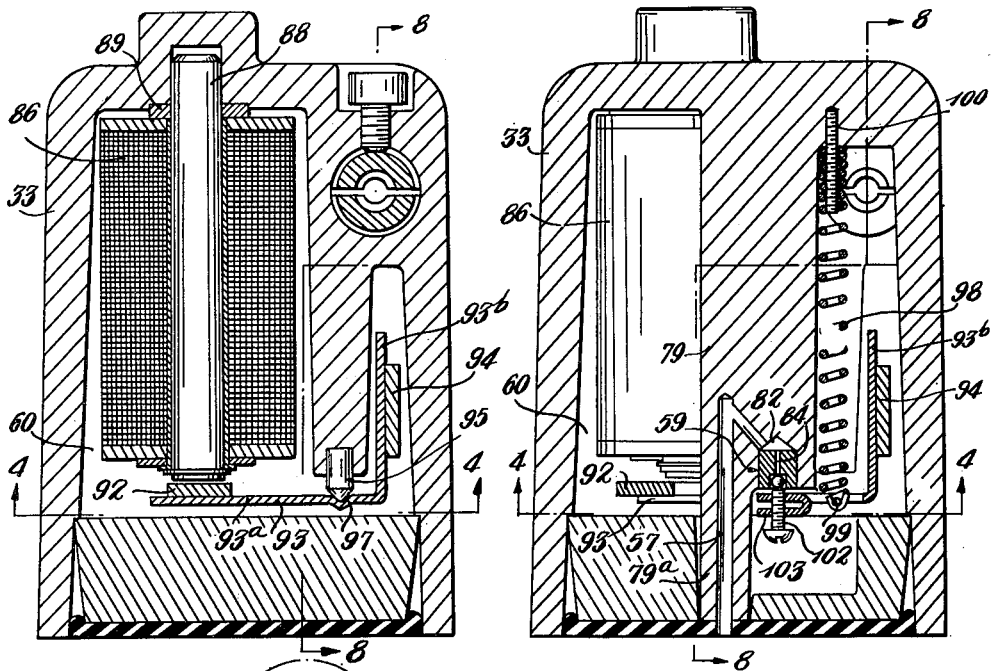
Figure 4:
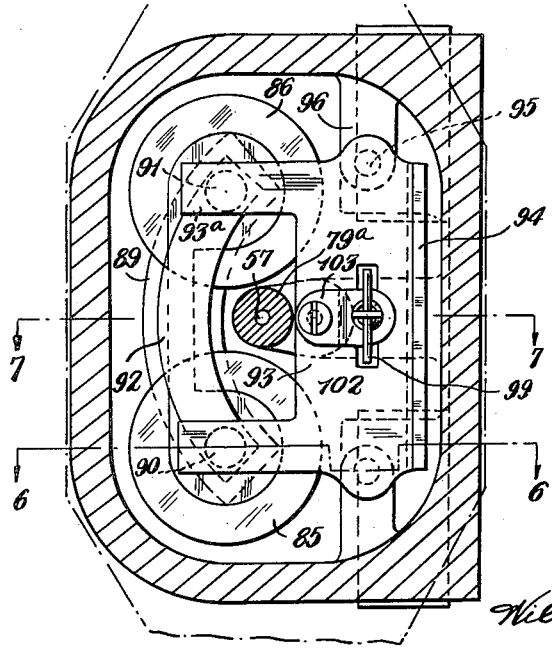
FIG. 4 is a transverse section taken through the adapter unit substantially as indicated by section line 4—4 of FIGS. 3, 6 and 7.
Figure 21:
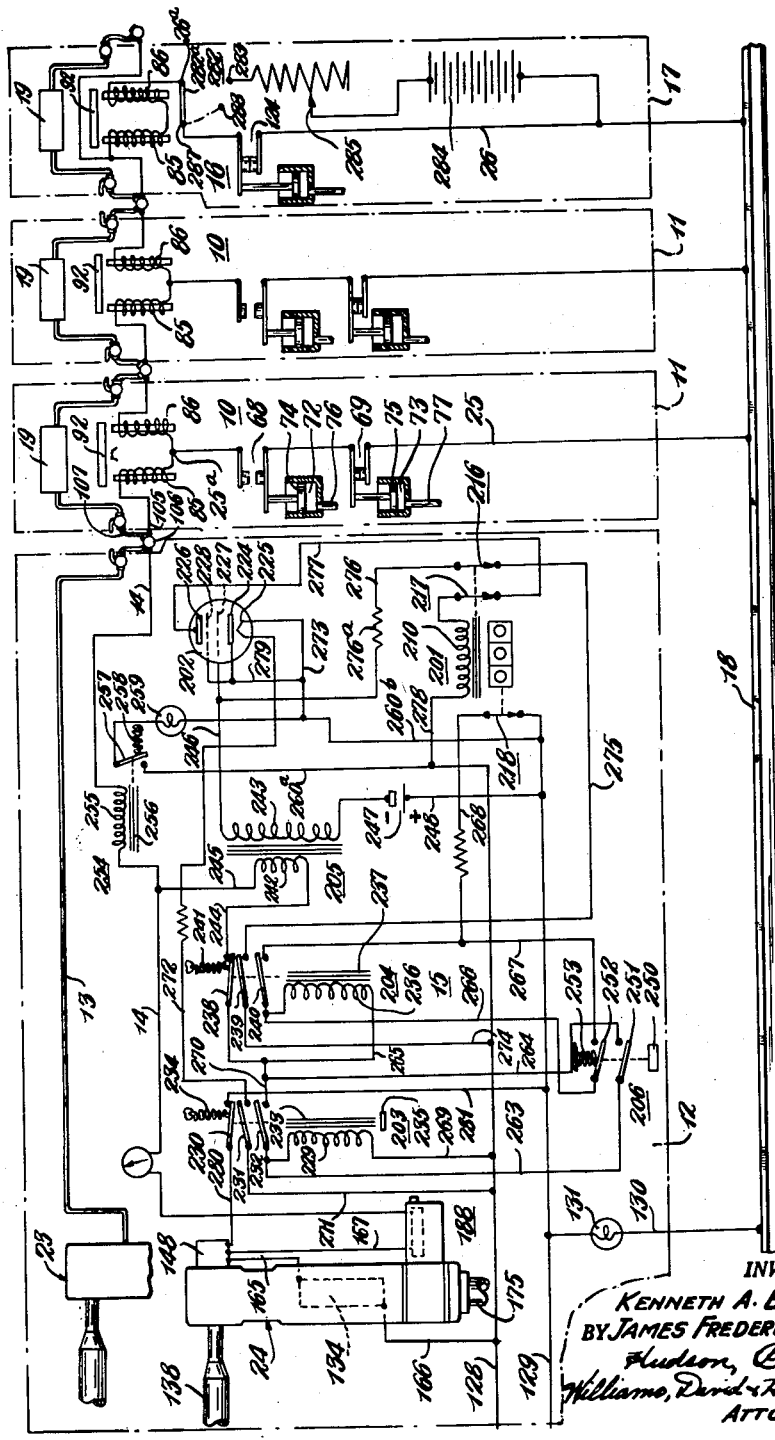

FIGS. 6 and 7 are partial vertical sections taken through the adapter unit substantially as indicated by section lines 6—6 and 7—7, respectively, of FIG. 4;

FIG. 8 is another partial vertical section taken through the adapter unit substantially as indicated by section line 8—8 of FIGS. 6 and 7;

FIGS. 9 and 10 are partial vertical sections taken through the switch devices of the adapter unit as indicated by section lines 9—9 and 10—10, respectively, of FIG. 5;

FIG. 11 is a transverse sectional detail taken through a portion of the adapter unit as indicated by section line 11—11 of FIG. 3;

FIG. 12 is a fragmentary vertical section corresponding with a portion of the view of FIG. 3 and showing the bleed valve thereof on a larger scale;

FIG. 13 is a perspective top and side view showing the electric current control and car counting unit located on the control vehicle or locomotive;

FIG. 14 is a vertical section taken through the current control device contained in the control unit of FIG. 13 and showing such current control device in detached relation;

FIG. 15 is a fragmentary vertical section taken through switch means located at the upper end of the current control device of FIG. 14 and showing such switch means on a larger scale;

FIG. 16 is a transverse sectional detail taken through the lower portion of the current control device as indicated by section line 16—16 of FIG. 14;

FIG. 17 is a fragmentary vertical section taken through electromagnetic bleed valve means located at the lower end of the current control device of FIG. 14 and showing such electromagnetic bleed valve means on a larger scale;

FIG. 18 is an elevation of a cam member of the current control device of FIG. 14 and showing such cam member in detached relation;

FIG. 19 is a perspective view showing the counting device of the control unit of FIG. 13 in detached relation;

FIG. 20 is a partial vertical section showing the escapement lever of the electromagnetic car counting device, the view being taken on section line 20—20 of FIG. 19; and FIG. 21 is a wiring diagram further illustrating the apparatus of this invention.

The apparatus of this invention comprises, in general, a valve and switch unit 10 located on each of the load vehicles or cars 11 of a train (see FIGS. 1 and 21) and connected with a control vehicle or locomotive 12 by means of a conventional brake pipe 13 and by a train wire 14. The apparatus also includes a current control and car counting unit 15 located on the locomotive 12, or in some cases at a stationary yard control station (not shown), and a valve and switch unit 16 located on a rear end control vehicle or caboose 17. The valve and switch units 10 and 16 are operably connected in circuit with a current control device 24 of the unit 15 by the train wire 14 and by a common ground conductor provided by the car couplers and the track and which is here represented by the rail 18.

The valve and switch unit

As shown in FIGS. 1, 2 and 3, the valve and switch unit 10 can be in the form of an adapter unit adapted to be applied to the control valve mechanisms 19 of the cars 11. This valve and switch unit 10 comprises a housing portion 10a in which certain valve devices and electric switches are contained, as explained hereinafter, and a substantially flat plate portion 10b.

The control valve mechanisms 19 of the cars 11 are conventional triple-valve mechanisms and here shown as being of the AB type and, as is understood by those skilled in the air brake art, each of these mechanisms comprises an intermediate mounting bracket portion 19a and a pair of service and emergency end portions 19b and 19c connected with such intermediate bracket portion. It is likewise understood by those skilled in the air brake art that the service end portion 19b embodies what is known as a triple valve mechanism. The unit 10 is applied to the control valve mechanism 19 by having the plate portion 10b sandwiched between the mounting bracket portion 19a and the emergency portion 19c. The control valve mechanism 19 is shown as being connected with the brake pipe 13, a conventional brake cylinder 20, a conventional auxiliary reservoir 21 and a conventional emergency reservoir 22, by suitable pipe connections 13a, 20a, 21a, and 22a. In addition to the purpose regularly served by the emergency reservoir 22 in conjunction with the AB control valve mechanism 19, this reservoir also serves as a supply reservoir for supplying pressure fluid to the brake cylinder 20 under the control of the unit 10.

As shown in FIGS. 1 and 21, the circuit connections for the valve and switch unit 10 also include a ground connection 25 on each of the cars 11 and which is here represented by a conductor extending from the housing portion 10a to the rail 18. The valve and switch unit 16 of the caboose 17 is provided with a similar ground connection designated 26. The control apparatus of the locomotive includes a conventional engineer's brake valve 23 with which the AB control valve mechanisms 19 are connected by the brake pipe 13, and the above-mentioned current control device 24 with which the valve and switch units 10 and 16 are connected by the train wire 14.

The plate portion 10b of the adapter unit 10 is provided with a number of openings which register with various openings of the mounting bracket portion 19a and the emergency portion 19c of the control valve mechanism 19. The housing portion 10a of the unit 10 is provided with a plurality of passages which extend into the plate portion 10b and communicate with certain of the openings of the latter for connecting the unit in operative relation with the control valve mechanism 19. These passages of the housing portion 10a comprise a brake pipe passage 28, a first brake cylinder passage 29, an emergency reservoir passage 30 and a second brake cylinder passage 31.

The brake pipe passage 28 receives brake pipe pressure from the control valve mechanism 19. The first brake cylinder passage 29 is connected with the brake cylinder 20 through the mounting bracket portion 19a. The emergency reservoir passage 30 is adapted to be connected with the emergency reservoir 21. The second brake cylinder passage 31 is connected with a suitable portion of the control valve mechanism, such as the inshot and timing valves thereof, and is either a pressure fluid passage or an exhaust passage depending upon the operation of the control valve mechanism. By way of example, U.S. Patent 2,031,213 granted February 18, 1936 shows a conventional control valve mechanism of the AB type above referred to and to which the present invention is applicable.

The openings of the plate portion 10b comprise a pair of recess openings or ports 27a and 27b in opposite faces of such plate portion and a number of through openings 27c, 27d, 27e, 27f, 27g, and 27h. The openings 27i, 27j and 27k are also through openings but these merely accommodate the connecting studs which connect the sections 19c and 10b with the bracket 19a.

The port 27a faces toward the bracket 19a and registers with the passage of the latter which is designated 178 in the above-mentioned AB brake patent. The port 27b faces toward the emergency section 19c and registers with the passage of the latter which is designated 178 in said patent. The through opening 27c registers with passage 91 of the AB brake patent which contains brake pipe pressure. The through opening 27d registers with passage 77 of the AB brake patent which is in communication with the emergency reservoir.

All of the through openings 27e, 27f, 27g and 27h are provided merely to maintain the continuity of those passages of the AB brake which extend into the emergency section 19c from the bracket section 19a. In the AB brake patent these continuous passages, with which the through openings 27e, 27f, 27g and 27h register respectively, are designated 51, 169, 193 and 113. The illustration in the AB brake patent, in which the passage 178 is shown as being of relatively small size, is diagrammatic. In the commercial embodiment of the AB brake, the passage 178 is of a relatively large size and the above-mentioned ports 27a and 27b communicate therewith, notwithstanding the offset relation in which these recess openings are shown in FIG. 2.

As best shown in FIGS. 2 and 3, the housing portion 10a of the valve and switch unit 10 comprises a supporting arm 32 through which the above mentioned passages 28, 29, 30 and 31 extend, a magnet housing 33 and a pair of plate members 34 and 35 clamped between the arm 32 and the magnet housing 33. The plate member 34 has a strainer and orifice chamber 36 therein with which the brake pipe passage 28 communicates and which contains a suitable strainer or filter 37 and an orifice plug 38 located inwardly of the strainer and provided with a restricted orifice passage 38a. The plate member 34 is also provided with a valve chamber 39 with which the reservoir passage 30 communicates and in which is located a valve seat 40. The valve seat 40 is disposed around an opening 41 by which the valve chamber 39 is connected with a connecting passage or lower control chamber 42.

The operation of the valve and switch unit 10 is described in detail hereinafter but, by way of general explanation, it is pointed out that this unit can be designed to operate in response to any desired value of brake cylinder pressure. The unit 10, as herein disclosed, operates in response to a minimum brake cylinder pressure of 8 p.s.i. Whenever a brake pipe reduction of an 8 p.s.i. value or greater is made by the engineer for the purpose of making either a pneumatically controlled or an electrically controlled application of the brakes, a brake cylinder pressure of 8 p.s.i. or greater should be developed in the brake cylinders of all cars of the train. Thus on all cars on which this minimum 8 p.s.i. brake cylinder pressure is actually developed, the units 10 of those cars will respond to such minimum brake cylinder pressure.

The valves and control chambers of the valve and switch unit

A brake application valve 43 located in the valve chamber 39 of the valve and switch units 10 and 16 is normally held in seating engagement with the valve seat 40 by a compression spring 44 but is adapted to be moved away from this seat by the hollow stem portion 45 of a thrust member 46. The plate member 34 also has an opening 47 therein forming an upward continuation of the passage 31 and communicating with a valve chamber 48. This valve chamber is in open communication with the connecting passage 42. A brake release valve 49 located in the chamber 48 is normally in an open position but is adapted to be moved to a closed position in engagement with an annular valve seat 50 surrounding the upper end of the opening 47.

The plate member 35 is provided with a pair of recesses forming upper control chambers 51 and 52 which are located above the valves 43 and 49, respectively. These control chambers are also formed, in part, by diaphragm members 53 and 54 defined by portions of a flexible sheet 55 clamped between the plate members 34 and 35. The diaphragm member 53 constitutes a fluid pressure differential responsive member for actuating the valve 43 and is movable in response to a pressure differential existing between the control chamber 51 and the connecting passage 42.

The diaphragm member 53 engages and overlies the upper end of the thrust member 46. The lower end of this thrust member is maintained in axial alignment with respect to the valve 43 by having the stem 45 slidable in the connecting opening 41. The cross-sectional shape of the stem 45 is of a non-circular form, as shown in FIG. 11, such that the flat portions 45a of the stem leave spaces in the opening 41 for the passage of fluid between the valve chamber 39 and the connecting passage 42. The upper end of the thrust member 46 is held in aligned relation with respect to the axis of the valve 43 as by means of a projection 53a on the underside of the diaphragm member 53 which engages in the upper end of the hollow stem 45.

The diaphragm member 54 constitutes a fluid pressure differential responsive member for actuating the valve 49. This diaphragm member is subject on the upper side thereof to the pressure of the control chamber 52 and on the underside thereof to the pressure of the brake cylinder passage 29. The control chamber 52 is connected with the control chamber 51 by a passage 56 formed in the plate member 35 and the control chamber 51 is, in turn, connected with a bleed passage 57 by a short passage 58. This bleed passage extends through the plate member 35 and through a portion of the magnet housing 33 to a normally open bleed valve 59. The bleed passage 57 is connected with a chamber 36 and, hence, is in communication with the brake pipe passage 28 through the restricted orifice 38a of the orifice plug 38. As is further explained hereinafter, the bleed passage 57 is a vent passage which is normally open to atmosphere but is controlled, as to the venting of air therethrough, by the restricted orifice 38a and the normally open bleed valve 59. The control chambers 51 and 52 are therefore always supplied with brake pipe fluid but at a relatively restricted rate as permitted by the restricted orifice 38a.

The size relationship between the restricted orifice 38a and the orifice 84 of the normally open bleed valve 59 is explained hereinafter.

*The bleed valve actuating magnet of the valve and switch unit*

The magnet housing 33 is here shown as being a cup-shaped member having a chamber 60 therein and a flange 33a adapted to be held in connected relation with the plate members 34 and 35 and the arm 32 by the screws 61. The flanged lower end of the magnet housing 33 is provided with a recess 62 in which is disposed a block 63. A flexible sheet 64 is disposed between the block 63 and the upper face of the plate member 35. A shoulder 65 at the upper end of the recess 62 applies pressure to the block 63 causing the latter to clamp the sheet 64 against the plate member 35.

The block 63 is provided with a pair of laterally spaced openings forming switch chambers 66 and 67 in which are located a pair of electric switches 68 and 69 which will be further described hereinafter. The portions of the sheet 64 which extend across the lower ends of the switch chambers 66 and 67 form diaphragm members 70 and 71 which cooperate with the plate member 35 in defining pressure chambers 72 and 73 for actuating the switches 68 and 69 by movement transmitted through plungers 74 and 75 overlying these diaphragm members and which are slidable in the lower ends of the switch chambers. The chamber 72 is connected with the brake cylinder passage 31 through a connecting passage 76 and through the opening 47 of the plate member 34. The chamber 73 is connected directly with the bleed passage 57 by the short connecting passage 77.

The magnet housing 33 is provided with a depending stem 79 located substantially centrally of the magnet chamber 60 and having a reduced lower end portion 79a which engages the diaphragm sheet 64. The bleed passage 57 extends into the stem 79 from the lower end thereof and communicates with a valve chamber 82 which is also formed in this stem. The bleed valve 59 is located in the valve chamber 82 and comprises a seat member 83a (see FIGS. 7 and 12) and a ball element 83b adapted to cooperate with such seat member for controlling a vent orifice 84 which extends through the seat member and constitutes a normally open vent for the bleed passage 57. Brake pipe fluid which is vented through the bleed passage 57 and the bleed valve orifice 84 escapes to atmosphere through a passage 80 and past a flexible insect guard 81.

A pair of magnet coils 85 and 86 are disposed in the chamber 60 of the magnet housing 33 and have core members 87 and 88 extending in substantially parallel relation. These core members are magnetically connected adjacent the upper end thereof by a yoke 89. The magnet coils 85 and 86 have their windings connected in series relation such that, with the core members 87 and 88 and the yoke 89, they form a substantially horseshoe-shaped electromagnet having a pair of spaced magnet poles 90 and 91 at the lower end of the magnet chamber 60. The magnet coils 85 and 86 have one end thereof connected with terminal sleeves 85a and 86a, respectively, which are mounted in the housing 33 (see FIG. 8) by means of insulating bushings 85b and 86b. The terminal sleeves are adapted to have ends of the train wire 14 detachably inserted thereinto. On the cars 11, the magnet coils 85 and 86 are connected together at the opposite end thereof and are also connected with the ground conductor 25, as represented by the terminal point 25a in FIG. 21. On the caboose 17, the coils 85 and 86 are in a series relation between the train wire 14 and the ground conductor 26.

An armature 92 disposed immediately below the poles 90 and 91 is movable in response to energization of the magnet coils 85 and 86 and is mounted on an armature carrier which, in this instance, is a substantially L-shaped member 93. The armature 92 is mounted on the upper side of the horizontally disposed forked arm portion 93a of the carrier and the other arm 93b of the carrier extends in upright relation at the rear of the magnet coils and carries a counterweight 94. The armature carrier 93 is fulcrumed on a pair of pointed fulcrum pins 95 which are carried by, and project downwardly from, a pair of depending posts or brackets 96 of the magnet housing 33. The pointed lower ends of the fulcrum pins engage in depressions 97 provided in the armature carrier 93 and these depressions are retained in seating engagement with the pins by the upward pull of a tension spring 98 having the lower end thereof connected with the armature carrier 93 by means of the anchor pin 99. This spring has its upper end connected with the magnet housing 33 as by means of an anchor pin 100 having a threaded portion engaged by convolutions of the spring.

The bleed valve of the valve and switch unit

Reverting now to the bleed valve 59 it will be seen that the valve seat member 83a is a cup-shaped member having a recess 101 in the underside thereof in which the ball element 83b is located. The outer end of the bleed valve orifice 84 opens into the recess 101 such that the ball element 83b will restrict or close this orifice when the ball element is lifted upwardly so as to seat against the member 83a at such outer end of the orifice. When the ball element 83b is permitted to drop away from the outer end of the orifice 84, the restriction of the bleed passage 57 by the valve 59 is correspondingly decreased. The bleed valve orifice 84, as controlled by the ball element 83b, is a normally open vent orifice for the bleed passage 57.

Actuating movement for the ball element 83b for controlling the bleed valve orifice 84 in this manner is provided by the armature carrier 93 in response to energization of the magnet coils 85 and 86. For this purpose the armature carrier 93 is provided with a screw 102 located in axial alignment with the orifice 84 and having its upper end disposed relative to the recess 101 such as to retain the ball element 83b in the latter. The screw 102 can be mounted in the armature carrier 93 by providing the latter with a reversely bent portion 103 in which the screw has threaded engagement as well as in the body portion of the armature carrier, as shown in FIGS. 7 and 12.

The point of the armature carrier 93 at which the tension spring 98 is attached is located substantially on the same transverse axis as the fulcrum pins 95 and the location of this common axis with respect to the valve actuating screw 102 and the masses represented by the armature 92 and the counterweight 94 is such that the armature assembly will be balanced or nearly balanced and will be responsive to very small actuating forces applied to the armature. This balanced condition for the armature assembly is such that when the magnet coils 85 and 86 are deenergized or the energization of these coils is decreased, the ball element 83b of the bleed valve 59 will be moved away from the outer end of the bleed valve orifice 84 by the pressure of the fluid in the passage 57. On the other hand when the magnet coils 85 and 86 are energized, the armature 92 will be drawn upwardly toward or against the poles 90 and 91 depending upon the extent of ampere turn energization of these magnet coils and will cause a corresponding restricting or closing movement of the ball element 83b relative to the outer end of the orifice 84.

The magnet coils 85 and 86 of the cars 11 and of the caboose 17 are connected in series relation by the train wire 14 as shown in FIG. 21. This train wire comprises conductors 105 on the respective cars which have their ends connected to the metal coupler members 106 which are carried by the flexible hoses 107 of the brake pipe 13. When the cars 11 and the caboose 17 are connected into a train and the brake pipe hoses 107 are coupled together in the usual way by the coupler members 106, the conductors 105 of the respective cars will form the continuous train wire 14 and the magnet coils 85 and 86 of the individual cars will be connected in series circuit relation with each other and with the current control and car counting unit 15 of the locomotive by such train wire.

The switches of the valve and switch unit

As shown in FIG. 21, the ground conductors 25 of the cars 11 are connected with the train wire 14 at a point between the magnet coils 85 and 86. The switches 68 and 69 of the valve and switch unit 10 are located in series relation in this ground connection. The switch 68 is a normally open switch, that is to say, it is open at all times while the brakes of the car are in the released condition. The switch 69 is a normally closed switch, that is to say, is in a closed position during the time that the brakes of the car are in the released condition.

As shown in FIGS. 3, 5, 9 and 10, the switch 68 comprises a pair of upper and lower contacts 108 and 109 carried, respectively, by stationary and movable switch arms 110 and 111. These switch arms are mounted on the block 63 by the screw 112 but are insulated from the block and screw by insulating members 113 and 114. The lower switch arm 111 is a resilient arm having a stirrup portion 115 engaged by the plunger 74 such that upward movement of the plunger in response to a build-up of fluid pressure in the diaphragm chamber 72 will cause closing of the switch contacts 108 and 109.

The switch 69 comprises a pair of upper and lower contacts 116 and 117 carried, respectively, by a pair of upper and lower switch arms 118 and 119. The switch arms 118 and 119 are connected with the block 63 by means of a screw 120 but are insulated from the screw and block by the insulating members 121 and 122. The upper switch arm 118 is a resilient arm and has a stirrup or yoke portion 123 disposed in straddling relation to the lower contact 117 and engaged by the plunger 75 such that upward movement of the plunger in response to a build-up of fluid pressure in the diaphragm chamber 73 will deflect the arm 118 upwardly and cause opening movement of the switch contact 116.

In addition to the above-described function of actuating the bleed valve 59, the magnet coils 85 and 86 serve another important purpose as an electric impulse generating means and produce signal impulses, as by self-induction resulting from a change in the energization of these coils. These signal impulses are transmitted by the train wire 14 to the current control and car counting unit 15 of the locomotive 12 where they cause operation of a counting mechanism, as will be further explained hereinafter. Whenever the coil 85 of the first car is energized by a portion of the train wire circuit which extends through the ground connection 25 of that car and the amount of such energization is suddenly changed by the opening of the switch 69, such a signal impulse will be produced for that particular car. Similarly, the opening of the switch 69 of the ground connection 25 of any given succeeding car in the train will cause such a signal impulse to be generated by the resulting sudden change in the energization of the coil 85 of the given car and of the coils 85 and 86 of the preceding cars.

To further explain the generation of these signal impulses it is pointed out that when the switches 68 and 69 of the first car 11 are closed the major portion of the train wire current will pass through the coil 85 and then to the ground 18 through the conductor 25. Because of the relatively high resistance of the other magnet coils 85 and 86 of the train a smaller portion of the train wire current will pass through such other coils. When the switch 69 of the first car is opened, all of the current which thereafter traverses the coil 85 of that car must also pass through the coil 86 of the first car and the coil 85 of the second car and, because of the increased resistance, the current in the coil 85 of the first car will be substantially reduced and the resulting sudden decrease in the energization of this coil will produce the signal impulse for the first car.

With respect to the valve and switch unit 16 of the caboose 17, it should be explained that this unit is similar to the valve and switch unit 10 of the car 11 in that it includes a bleed valve 59 controlled by an electromagnet which comprises magnet coils 85 and 86, and also includes a normally closed electric switch 124 located in the caboose ground connection 26. The switch 124 corresponds with the switch 68 of the car units 10 and is constructed and actuated in the same manner but is a normally closed switch instead of a normally open switch, and is opened to disable the ground connection 26 of the caboose by the same pressure fluid function as that which causes closing of the switches 68. It should also be explained with respect to the ground connection 26 that this conductor forms a direct connection between the rear end of the train wire 14 and the ground conductor 18, but its point of connection with the train wire is rearward of the magnet coil 86, as indicated at 26a, instead of between the magnet coils as is the case with the ground connections 25 of the cars 11.

*Pneumatic application of brakes*

With the construction and arrangement of the valve and switch units 10 and 16, as thus far described above, the brakes of the cars 11 and caboose 17 can be applied or released pneumatically in the regular way by the control functioning of the control valve mechanisms 19 in response to pressure variations in the brake pipe 13 initiated by manipulation of the engineer's brake valve 23. An application or release of the brakes thus produced can be conveniently referred to as a pneumatic application or a pneumatic release. The brakes of the cars 11 and the caboose 17 can also be applied or released under the control function of the valve and switch units 10 and 16 in response to manipulation of the current control device 24 of the locomotive 12, as is explained in greater detail hereinafter. An application or release of the brakes in response to such manipulation of the current control device 24 can be conveniently referred to as an electric application or an electric release.

*Electric application of brakes*

The electric application of the brakes is further explained in the detailed operation described hereinafter, but at this point a general description of an electric application will be given. Whenever energizing current is supplied from the locomotive 12 through the train wire 14 for producing an electric application, the current will traverse the coils 85 and 86 of the valve and switch unit 10 of each car and in energizing these coils will cause the bleed valve 59 to be actuated toward its closed position, thereby restricting or closing the bleed passage 57 and thus restricting or preventing the escape of brake pipe fluid through this bleed passage to atmosphere. Such restricting or closing of the bleed passage 57 will cause air pressure being supplied from the brake pipe 13 through the restricted orifice 38a to build up in the control chamber 51 and exert a downward pressure on the diaphragm member 53 and the thrust member 46 causing the valve 43 to be moved away from the seat 40. The opening of the valve 43 permits pressure from the reservoir passage 30 to be supplied through the connecting passage 42 to the brake cylinder passage 29 from which it passes to the brake cylinder 20 to cause an application of the brakes.

At the same time that the brake pipe pressure builds up in the control chamber 51 it also builds up in the control chamber 52 causing a downward movement of the diaphragm member 54 which shifts the valve 49 into engagement with the seat 50. The closing of the valve member 49 prevents the pressure being supplied to the brake cylinder through the brake cylinder passage 29 from flowing back to the control valve mechanism 19 through the passage 31.

The force with which the brakes of the cars will be applied will depend upon the extent to which the bleed passage 57 is restricted by the closing movement of the bleed valve 59. The force producing closing movement of the bleed valve 59 is, in turn, dependent upon or proportional to the extent of the ampere-turn energization of the magnet coils 85 and 86 and such energization of these coils depends upon the ampere value of the energizing current being supplied from the locomotive 12 through the train wire 14. The valves 43 and 49, as thus controlled by the bleed valve 59, the magnets 85, 86 and the train wire current, constitute a very sensitive relay valve means. Since the pressure fluid being supplied to the brake cylinder by the opening of the valve 43 also acts on the underside of the diaphragm member 53, it will oppose the pressure of the control chamber 51 such that the resulting brake cylinder pressure will be proportional to the train wire current. It will therefore be seen that by merely controlling the ampere value of the train wire current, the brakes can be applied with any desired force and can also be graduated on or off to any extent desired.

As pressure fluid is supplied to the brake cylinder 20 from the reservoir 22 during the electric application, the pressure builds up in the brake cylinder and in the lower control chamber 42 until it substantially balances the pressure in the control chamber 51 whereupon the spring 44 closes the valve 43. This closed position for the valve 43 is the lap condition for the control valve mechanism embodying the valve and switch unit 10.

In making an electric release of the brakes through the control function accomplished by the valve and switch units 10 and 16, the energizing current being supplied through the train wire 14 is interrupted to deenergize the magnet coils 85 and 86. Upon deenergization of these magnet coils the bleed valve 59 will open, as explained above under the heading relating to the bleed valve of the valve and switch unit, permitting the pressure in the control chambers 51 and 52 to escape to atmosphere. While the bleed valve remains open, the brake pipe fluid being supplied through the orifice 38a escapes freely to atmosphere through the bleed valve orifice 84 and will no longer cause a build-up of pressure in the control chambers 51 and 52. The release of pressure from the control chamber 52 permits brake cylinder pressure acting on the underside of the diaphragm member 54 to open the valve 49, thereby connecting the brake cylinder passage 29 with the passage 31 to permit the exhaust of brake cylinder pressure through the latter passage and through the exhaust means of the control valve mechanism 19.

Since the current supplied through the train wire 14 will produce an instantaneous energization or deenergization of the magnet coils 85 and 86 of all of the cars of the train, an electric application or an electric release will be produced for all of the brakes simultaneously. The escape of brake pipe fluid continuously through the normally open bleed passage 57 while the brakes are released will not waste any material amount of air because the bleed orifice 38a is of minute size. This bleed orifice is of such small size that, for normal charge conditions of the brake system, the leakage therethrough will not exceed 0.2 p.s.i. per minute.

The air brake apparatus of each car contains a substantial storage volume for air under pressure formed by the various reservoirs, chambers, pipes and passages which are charged with such air under pressure. The bleed orifice leakage of this permissible 0.2 p.s.i. for any given car represents a pressure drop and must be evaluated with respect to that car's own air storage volume and, on that basis, is so small as to be of negligible effect so far as the practical and successful operation of the air brake apparatus of that car is concerned, particularly under circumstances of air replenishment at a normal rate from the locomotive. Since the relation of bleed orifice leakage to air storage volume is this same 0.2 p.s.i. value (pressure drop) for each car, it is immaterial that the cars are coupled together with a continuous brake pipe connecting their respective air storage volumes. The permissible 0.2 p.s.i. leakage value is, therefore, not additive but represents the over-all bleed orifice leakage rate of pressure drop regardless of how many cars are in the train. It is assumed, of course, that the volume of fluid vented at each car does not exceed the capacity of the locomotive equipment to maintain normal brake pipe pressure against such accumulative leakage when the cars are coupled together in a train.

With respect to the size relationship between the bleed orifice 38a and the vent orifice 84, it should be explained that the cross-sectional area and flow capacity of the latter or vent orifice 84 is somewhat greater than the cross-sectional area and flow capacity of the former bleed or control orifice 38a. This size relationship permits the orifice 84 to vent air pressure from the chambers 51, 52 and 73 when the valve element 83b is released for opening movement, regardless of the fact that air pressure is being continuously delivered into the passage 57 through the orifice 38a.

A pneumatic application of the brakes initiated from the engineer's valve 23, as either a service application or an emergency application, can be made at any time without interference from the electrically controlled apparatus. When such a pneumatic application is made, air from the inshot and timing valves of the emergency portion 19c of the AB control valve mechanism 19 flows into the switch and valve unit 10 through passage 31 and then flows past the valve 49 and through the brake pipe passage 29 to the brake cylinder. During the pneumatic release of the brakes, the brake cylinder pressure is released from the brake cylinder by flowing through the passage 29 and the passage 42 from which it then flows through the passage 31 to the control valve mechanism 19 and is discharged to atmosphere through the exhaust opening of the latter.

*The current control and car counting unit*

The current control and car counting unit 15 of the locomotive 12 will be described next. This control unit contains the above-mentioned current control device 24 which is adapted to be manually actuated by the engineer for causing the above-explained electric application or electric release of the brakes to be made. The current control device 24 controls the ampere value of the energizing current which is supplied to the train wire 14 in making electric applications of the brakes and enables the engineer to vary this ampere value of the train wire current in accordance with the force with which he wishes the brakes to be applied or held.

Before proceeding with the detailed description of the current control device 24 and the other components of the control unit 15, it should be explained that a suitable current source is provided on the locomotive and can be in the form of a generator or storage battery, but is here represented merely as a pair of line conductors 128 and 129. The line conductor 129 is connected with the common ground 18 through the conductor 130 and the resistance device 131. The resistance device 131 is preferably in the form of a lamp having a low resistance when its filament is unheated and having a relatively high resistance when the filament is hot. This resistance device also serves as a signal lamp which will become lighted whenever a short-circuit of substantial current flow capacity occurs on the locomotive between the electrical apparatus of the control unit 15 and ground, or whenever a short-circuit occurs involving the ungrounded side of the locomotive wiring.

*The current control device*

The current control device 24 comprises a housing 132 (see FIG. 14) having an axial chamber 133 therein in which is located a carbon pile resistor 134. The carbon pile is insulated from the wall of the housing 132 by a suitable insulating lining 135. The lower end of the carbon pile is solidly supported by a transverse wall 136 of the housing and the upper end of the pile is adapted to be subjected to a variable pressure by means of an electrically conducting pressure plate 137. Variable pressure is adapted to be applied to the upper end of the carbon pile by lateral swinging of a control handle 138 and by the action of a rotary cam member 139 which is adapted to be rotated by such swinging of the handle.

The rotary cam member 139 is in the form of a sleeve which is supported in the upper portion of the housing 132 for rotation about the axis of the carbon pile 134. The upper end of this cam member is connected with the inner end of the handle 138 by means of a transverse pin 140. The lower portion of the cam member 139 has an axial passage 141 therein forming a guideway in which a plunger 142 is slidable. A spring 143 disposed between the plunger 142 and the pressure plate 137 transmits pressure to the carbon pile according to the extent to which the spring has been loaded by downward axial movement of the plunger.

For imparting such downward axial movement to the plunger 142 the cam member 132 is provided with a pair of helical cam slots 144 in the side wall thereof (see FIG. 18) which cooperate with a cam follower in the form of a transverse pin 145 which extends through these cam slots and engages the upper end of the plunger 142. The ends of the pin 145 extend into a pair of opposed vertical slots 146 of the housing 132. These slots hold the pin 145 against revolving in the housing with the cam member 139 but permit the pin to be shifted axially in the housing by the cam slots 144 in response to rotation of the cam member. This axial shifting of the pin 145 in the slots 146 forces the plunger 142 downwardly to load the spring 143. The extent to which the spring 143 is loaded in this manner will correspond with the angular amount of lateral swinging which has been imparted to the control handle 138 by the engineer.

*The train wire switch*

A switch device 148 mounted on the housing 132 of the current control device 24 and controlling the train wire circuit (see FIGS. 14, 15 and 21) can be conveniently described at this point. The switch device 148 comprises a housing or shell 149, which is mounted on the housing 132 in substantially opposed relation to the inner end of the handle 138, and a plurality of pairs of switch contacts contained in such shell. One pair of these contacts, namely the contacts 150 and 151, constitute a switch 152 which is open when the handle 138 is in an off position, that is to say in a position corresponding with the released condition of the brakes of the train and is adapted to be closed by the initial swinging movement of the handle in the direction to cause an electric application of the brakes. The other pair of contacts, namely the contacts 153 and 154, constitute a second switch 155 which is closed when the handle 138 is in an off position corresponding with the released condition of the brakes of the train but is adapted to be opened immediately upon movement of the handle away from such off position and toward a position corresponding with an electric application of the train brakes.

The contacts 150 and 154 of the switches 152 and 155 are substantially stationary contacts carried by switch arms 156 and 157. The contacts 151 and 153 are movable contacts and are carried by a flexible switch arm 158. The switch arms 156, 157 and 158 are supported in the housing 149 by means of suitable insulating blocks 159 disposed between the pairs of these arms and between the arm 156 and the housing 132. A fastening screw 160 extending through the insulating blocks and the switch arms and insulated from the latter secures the switch assemblies 152 and 155 to the housing 132.

To render the switches 152 and 155 responsive to the swinging of the handle 138 for causing the above mentioned actuation of these switches, a plunger 161 made of insulating material is mounted in a radial opening 162 of the housing 132 and has a stem portion 161a extending into the switch housing 149 and engaging the intermediate switch arm 158. The plunger 161 is provided at its inner end with a head 161b which engages a rounded cam surface 163 formed on the inner end of the handle 138. A compression spring 164 disposed in the opening 162 and engaging the head 161b holds the latter against the cam surface 163.

The contour of the cam portion 163 is such that swinging of the handle 138 away from its off position and in the direction to produce an electric application of the brakes of the train permits the plunger 161 to be moved inwardly by the spring 164 thereby releasing the intermediate switch arm 158 to cause closing of the switch 152 and opening of the switch 155. When the handle 138 is swung in the opposite direction to its off position, the cam surface 163 causes an outward movement of the plunger 161 which deflects the switch arm 158 toward the right to thereby open the switch 152 and close the switch 155.

The same swinging movement of the handle 138 away from its off position and in the direction to cause an electric application of the brakes of the train also causes rotation of the cam member 139 in a direction to produce a downward movement of the plunger 142 by the pin 145 thereby compressing the spring 143 and loading the carbon pile 134 to decrease its resistance.

As shown in FIGS. 14 and 21, the upper end of the carbon pile is electrically connected with the contact 150 of the switch 152 by a conductor 165. The lower end of the carbon pile is connected with the line conductor 128 by the conductor 166. The contact 151 of the switch 152 is connected with the train wire 14 by circuit means which includes a conductor 167 connected with the intermediate switch arm 158 such that the variation in the resistance of the carbon pile 134, as above explained, will control the ampere value of the current being supplied to the train wire.

*Action of brake pipe fluid on current control device*

To permit the carbon pile 134 to be accurately adjusted to the current value desired to be transmitted through the train wire 14 such that the same amount of actuation of the control handle 138 will always result in the same current value being supplied to the train wire regardless of the length of the train or the resistance of the train wire circuit, the current control device 24 is provided at the lower end thereof with valve mechanism 169 by which pressure fluid is supplied from the brake pipe 13 and is made to counteract and balance the compressive load being applied to the carbon pile by the spring 143. The valve mechanism 169 includes a housing section 170 mounted on the lower end of the housing 132 and containing a diaphragm chamber 171 and a valve chamber 172. A passage 173 extending axially of the housing section 170 connects the diaphragm chamber 171 with the valve chamber 172 and is surrounded at its lower end by a valve seat 174. The mechanism 169 also includes a conduit 175 which is connected with the brake pipe 13 and supplies pressure fluid from the latter to the valve chamber 172 through a passage 176. This passage is provided with a strainer 177 and an orifice plug 178 having a restricted orifice 178a therein.

A diaphragm 179 extending across the diaphragm chamber 171 is connected with a shouldered lower portion of a push rod 180 which extends axially through an opening 181 of the carbon pile 134. The upper end of the push rod 180 engages the underside of the pressure plate 137 to receive motion from the latter. At its lower end the push rod 180 is provided with a reduced extension 182 which is in engagement with a valve plate 183. A valve member 184 carried by the plate 183 is normally held in engagement with the valve seat 174 by a compression spring 185 disposed in the valve chamber 172 and acting on the valve plate.

When the handle 138 of the current control device 24 is swung in a direction to produce an electric application of the train brakes it causes loading of the carbon pile 134, as explained above. The initial downward movement of the pressure plate 137 which causes such loading of the carbon pile is transmitted downwardly by the push rod 180 to unseat the valve 184. This permits brake pipe fluid to flow from the conduit 175 through the restricted orifice 178a into the valve chamber 172 and then through the passage 173 into the diaphragm chamber 171.

*The electromagnetic bleed valve of the current control device*

To control the effect on the diaphragm 179 of the brake pipe fluid thus supplied to the diaphragm chamber 171, this chamber is provided with a bleed passage or vent 187 which is controlled by a bleed valve device 188 of the solenoid type. While the bleed passage 187 remains open, the brake pipe fluid will be vented to atmosphere and no appreciable pressure value will be built up in the diaphragm chamber 171. When the bleed passage 187 is restricted or closed, pressure will build up in the chamber 171 to an extent corresponding with the restriction imposed on the bleed passage and such pressure acting on the diaphragm 179 will oppose the loading force being applied to the upper end of the carbon pile 134. In order that the opposing force thus exerted by the diaphragm 179 be in accordance with a definite function of the train wire current, the solenoid bleed valve device 188 is arranged to be energized by train wire current such that the pressure of brake pipe fluid effective in the diaphragm chamber 171 will be dependent upon the ampere value of the current actually being supplied to the train wire.

As shown in FIG. 17, the solenoid bleed valve device 188 accordingly comprises a pair of magnet coils 189 connected in series relation in the train wire circuit and a bleed valve 190 which is responsive to the energization of the magnet. The bleed valve 190 is of a construction similar to that of the above-described bleed valve 59 of the valve and switch units 10 and 16 and comprises an orifice plug 191 having a vent orifice 192 therein and also forming a seat for a ball valve element 193. The ball element 193 controls the orifice passage 192 by closing the same, or varying the restriction thereof, and is adapted to be moved toward its closed position by a screw 194 extending through an armature carrier 195. An armature 196 mounted on the carrier 195 is movable relative to the magnet coils 189 in response to variations in the energization thereof by the train wire current. A tension spring 197 corresponding with the spring 98 of the bleed valve 59 acts on the armature carrier 195 to hold the latter in a substantially balanced condition such that when the magnet coils 189 are deenergized the pressure of the fluid in the passage 187 will move the ball element 193 toward its open position.

The magnet coils 189 and the bleed valve 190 are contained in a suitable housing 198 which is connected with the housing section 170 such that the bleed passage 187 extending into the housing 198 connects the diaphragm chamber 171 with the atmosphere through the normally open orifice passage 192 of the bleed valve. The fluid vented from the diaphragm chamber 171 through the bleed valve 190 is permitted to escape from the housing 198 through the vent passage 199. When the energization of the magnet coils 189 by the current being supplied to the train wire 14 moves the armature 196 to cause restriction or closing of the bleed orifice 192, the brake pipe fluid being supplied to the diaphragm chamber through the orifice 178a and the passage 173 will cause pressure to build up in the diaphragm chamber and oppose the loading force being applied to the upper end of the carbon pile 134. The pressure will continue to build up in the diaphragm chamber 171 until it is sufficient to cause opening of the ball element 193 of the bleed valve device 190 against the pull of the magnet coils 189 or, in other words, until this pressure is proportional to the current value of the train wire current.

*The electromagnetic counting device*

The electric car counting apparatus forming a part of the unit 15 of the locomotive 12 will be described next. This car counting apparatus is not essential for producing an electric application of the train brakes but provides a means by which the pneumatic operativeness of the brake mechanisms of all of the cars of the train can be readily checked or inspected from the locomotive. This counting mechanism comprises in general, an electromagnetic counting device 201, a vacuum tube or thermionic valve 202 of the kind known as a thyratron and a pair of electromagnetic relays 203 and 204. The counting apparatus also includes a transformer 205 and a manually operable push button switch 206 actuatable by a push button 250.

As shown in FIGS. 19, 20 and 21, the electromagnetic counting device 201 comprises a group of rotatable digit wheels, in this instance three such wheels 207a, 207b and 207c, mounted on a shaft 208 and adapted to be actuated by an escapement lever 209 in response to energization of an electromagnet 210. An armature 211 is mounted on a pivot shaft 212 for swinging movement relative to one end of the electromagnet 210. The lever 209 is connected with, or formed as a part of, the armature 211 and cooperates with a star wheel 213 for actuating the digit wheels.

Movement of the armature 211 towards the magnet 210 upon energization thereof will cause the lever 209 to rotate the star wheel 213 through an angular distance which will shift the digit wheel 207a through one-half the distance from one of its digit markings to the next consecutive marking. Return movement of the armature away from the magnet 210 is produced by a spring 214 and the corresponding movement of the lever 209 in the return direction completes the angular movement of the digit wheel 207a to the full digit position. With respect to the digit wheel 207c, it should be noted that the digit markings of this wheel consist only of the numbers 0 and 1 in alternating relation therearound. The purpose of this particular marking for the digit wheel 207c is to facilitate resetting of the counting device to zero by turning the digit wheels ahead instead of backward. Except for this feature of the alternating 0 and 1 markings of the digit wheel 207c, this counting device is more or less conventional with respect to the digit wheels and their actuation by the electromagnet 210 and the forked lever 209. As is usual in devices of this kind, the first digit wheel 207a is driven alone until it has moved through nine digit spaces whereupon it drives the second digit wheel 207b through one digit space. When the second digit wheel 207b has been actuated through nine digit spaces it then drives the third digit wheel 207c, with which the cam wheel 222 is connected, through one digit space. Thus when the counting device 201 has been operated through a cycle such that the visual indication being given by the digit wheels is 199 (which is in excess of the total number of cars ever present in the train), the three digit wheels will thereupon be automatically restored to their zero setting.

*The electric switches of the electromagnetic counter*

The counting device 201 also includes a plurality of electric switches 216, 217 and 218 controlling the functioning thereof and all of which switches are in the closed position when the electromagnet 210 is deenergized. The switch 216 includes a relatively long depending switch arm 216a adapted to be engaged by the armature 211 and located on one side thereof and, similarly, the switch 217 includes a relatively long depending switch arm 217a adapted to be engaged by the armature and located on the opposite side thereof. The switch 216 also includes a contact arm 216b extending in parallel relation to the contact arm 216a and, similarly, the switch 217 includes a contact arm 217b extending in parallel relation to the contact arm 217a. The paired contact arms 216a and 216b of the switch 216 have their upper ends insulated from each other and mounted on an insulating support 219. Similarly, the contact arms 217a and 217b of the switch 217 have their upper ends insulated from each other and mounted on the insulating support 219.

The switch arms 216a and 217a are flexible arms having a spring bias such that during the initial movement of the armature 211 towards the magnet 210, the switch arm 216a will follow the armature and cause opening of the switch 216. During this movement of the armature 211 towards the magnet coil 210, the armature engages the switch arm 217a such that the final portion of the movement of the armature toward the magnet will cause opening of the switch 217. During movement of the armature away from the magnet 210 upon deenergization of the latter, the switch arm 217a will follow the armature and cause reclosing of the switch 217. During the final portion of the return movement of the armature, it will pick up the switch arm 216a and deflect the same to cause reclosing of the switch 216.

The switch 218 is a normally closed switch comprising a pair of switch arms 218a and 218b extending in parallel relation to each other and to the shaft 208. These switch arms are mounted at the left-hand end thereof, as seen in FIG. 19, on an insulating support 220 and are insulated from each other. The switch arm 218a is longer than the switch arm 218b and has an inturned end portion 221 which cooperates with a cam wheel 222 which is connected with the digit wheel 207c. The cam wheel 222 has cam points or teeth 222a thereon and one of these teeth will engage the end portion of the switch arm 218a each time the digit wheel 207c is shifted from its numeral 1 setting to its zero setting. The switch arm 218a is a flexible arm having a spring bias in a direction to reclose the switch 218 when an actuating tooth 222a has moved past the end portion 221 of this switch arm.

*The thermionic tube*

The thermionic tube 202 is of the type comprising a gas-filled envelope having therein a cathode 224, a cathode heater or filament 225, a plate 226 and a control grid 227. In this instance the tube 202 is shown as also having a second grid 228 therein which is connected directly with the cathode 224. This thermionic tube 202 is of the kind known as a "thyratron" and has the characteristic that when suitably connected in circuit and a signal impulse is supplied to the control grid 227 such as to cause a plate current to flow, the plate current will continue to flow after the signal impulse has subsided and until the plate circuit is opened or until the supply of heating current to the cathode heater 225 is cut off.

*The counter control relays*

The electromagnetic relay 203 is a so-called slow release relay which controls the counting operation of the electromagnetic counting device 201 and provides for the stopping of the counting operation at the proper time. This relay comprises a solenoid coil 229 and a plurality of switches 230, 231 and 232. This relay also includes a solenoid plunger 233 which is connected with the movable switch arms of the switches 230, 231 and 232. When the relay 203 is deenergized, the switch arms are moved by a tension spring 234 in a direction to cause closing of the switch 230 and opening of the switches 231 and 232. Conversely, the energization of the solenoid coil 229 causes opening of the switch 230 and closing of the switches 231 and 232.

When the solenoid coil 229 of the relay 203 is deenergized, the actuation of the switches 230, 231 and 232 is delayed for a short time interval for a purpose to be explained hereinafter. This is accomplished by an inherent characteristic of the relay resulting from a conducting body 235, such as a copper slug or coil, being located at one end of the coil 229 and in which eddy currents will be induced and will have the effect of delaying the actuation of the switches 230, 231 and 232 upon deenergization of the solenoid coil.

The relay 204 is of a construction similar to the relay 203 but is a quick release relay by reason of the fact that it does not embody any delaying element corresponding with the element 235 of the relay 203. The relay 204 comprises a solenoid coil 236 and a movable core member 237. This relay also includes switches 238, 239 and 240 having movable switch arms connected with the core 237 to be actuated thereby in one direction upon energization of the coil 236. A tension spring 241 acts on the switches 238, 239 and 240 to shift the same in the opposite direction upon deenergization of the solenoid coil 236. When the relay 204 is deenergized, the effect of the spring 241 is to maintain the switch 238 closed and the switches 239 and 240 open. Conversely, when the relay 204 is energized the switch 238 is opened and the switches 239 and 240 are closed.

*Other components of current control and car counting unit*

The transformer 205 is of the type commonly used in conjunction with vacuum tube circuits and comprises a primary winding 242 and a secondary winding 243. One end of the primary 242 is connected with the switch 238 by the conductor 244 and the other end of the primary is connected with the train wire 14 by the conductor 245. One end of the secondary winding 243 is connected with the control grid 227 by the conductor 246 and the other end of the secondary is connected with the supply line conductor 129 through a battery 247 and a conductor 248. The battery 247 furnishes a negative potential bias for the control grid 227.

The push button switch 206 comprises the manually movable member or button 250 and a pair of normally open switches 251 and 252. These switches are held in the open position by a compression spring 253 but are adapted to be closed momentarily by depressing the push button 250.

As shown in FIG. 21 the current control and car counting unit 15 of the locomotive also includes a relay 254 comprising a magnet coil 255 and a movable core member 256. The relay 254 also includes a switch 257 having a movable switch arm connected with the core 256 for actuation thereby. A tension spring 258 acting on the switch 257 holds the same in an open position when the magnet coil 255 is deenergized. The magnet coil 255 is located in series relation in the train wire 14 such that when the train wire circuit is energized the switch 257 will be closed. The switch 257 controls a pilot light 259. The energizing circuit for this pilot light comprises conductors 260a and 260b which are connected, respectively, with the supply line conductors 128 and 129 and extend to the switch 257. Whenever the train wire circuit is energized, the switch 257 will be closed by the relay 254 to cause the pilot light 259 to be lighted, thus giving a visual indication that an electric application of the brakes is being made.

The above described components of the current control and car counting unit 15 can all be housed and protected in a suitable casing such as the casing 261 shown in FIG. 13. This casing is adapted to be suitably supported on the locomotive and is provided with an opening 261a through which the control handle 138 projects and with a window 261b through which the reading of the electromagnetic counter 201 can be observed. The push button 250 of the push button switch 206 also projects from the casing 261 for convenient manual actuation by the engineer. The pilot lamps 131 and 259 are also located in the casing 261 and can be observed through suitable openings or windows thereof, as shown in FIG. 13.

*Operation in making an electric application of the train brakes*

The operation of the air brake apparatus will now be described in greater detail and such detailed operation will first be given for an electric application of the brakes of the train. In making an electric application of the brakes, the engineer swings the lever 138 of the current control device 24 from its off position and toward its applied position for a distance corresponding with the force of the brake application desired to be made. At the time that such an electric application of the brakes is made the pneumatic control valve mechanisms 19 will be in the position corresponding with the released condition of the brakes. The initial swinging movement of the handle 138 toward the applied position actuates the train wire switch device 148 during which the cam portion 163 of the handle permits the plunger 161 to be shifted by the spring 164, thereby causing opening of the switch 155 and closing of the switch 152.

The closing of the switch 152 connects the train wire 14 with the supply line conductor 128 through magnet coils 189 of the bleed valve device 188, through the carbon pile 134 and the conductor 166. The on position to which the handle 138 is moved will cause compression of the spring 143 of the current control device 24 for loading the carbon pile 134, thus decreasing the resistance of the carbon pile to a value which will permit current of a desired ampere value to be supplied to the train wire 14.

The loading of the carbon pile 134 by the spring 143 will be balanced by the pressure of the brake pipe fluid which is supplied to the diaphragm chamber 171 through the passage 173 in response to the opening of the valve 184 by the push rod 180. The pressure of brake pipe fluid which builds up in the diaphragm chamber 171 is in accordance with the extent to which the normally open bleed passage 187 is restricted by the bleed valve 190 of the electromagnetic bleed valve device 188, as previously explained herein.

The actuation of the handle 138 to the position for producing a desired electric application of the brakes causes an initial over-compression of the carbon pile 134 which is relieved by the opposing force of the rod 180 as soon as fluid pressure builds up in the diaphragm chamber 171. This initial over-compression of the carbon pile is a desirable feature because it permits an initial train wire current of a somewhat excessive value to be supplied to the train wire 14 and this will insure an initial strong energization of the magnet coils 85 and 86 to pull in the armatures 92 and bring about a prompt electric application of the brakes.

The energizing current which is thus supplied to the train wire 14 by the current control device 24 passes through the coil 255 of the relay 254 causing the switch 257 to be closed, thereby lighting the pilot light 259. The train wire current also passes through the coils 85 and 86 of the valve and switch units 10 and 16 of the cars 11 and the caboose 17. At the caboose this energizing current flows to the common ground conductor 18 through the normally closed switch 124 and the ground connection 26. The train wire circuit is completed from the ground 18 to the supply line conductor 129 through the conductor 130 and the lamp 131.

The train wire current energizes the magnet coils 85 and 86 of the valve and switch units 10 and 16 causing the bleed valves 59 of these units to be restricted or closed by movement of the ball element 83b toward the seat element 83a. The restriction of the bleed orifices 84 of the valve and switch units 10 and 16 in this manner causes the pressure of the brake pipe fluid being supplied through the orifice passages 38a to build up in the control chambers 51 and 52 to cause opening of the valve 43 and closing of the valve 49. As already explained above, the opening of the valve 43 permits pressure fluid to be supplied from the emergency reservoir 22 to the brake cylinder 20 through the passages 30 and 29 to cause an application of the brakes. At the completion of the electric application, the brake cylinder pressure in the passage 42 will have built up to substantially the value of the control pressure in the chamber 51 whereupon the valve 43 is closed by the spring 44. This closed position for the valves 43 and 49 is the lap condition of the apparatus during which the brakes will be maintained in their applied position.

The closing of the valve 49 prevents the pressure which is being supplied from the emergency reservoir 22 from flowing back into the control valve mechanism 19 through the passage 31. The force with which the brakes are applied will depend upon the ampere value of the energizing current supplied to the magnet coils 85 and 86, as previously explained herein, and after an electric application of the brake has thus been made the brakes can be graduated on or off a desired amount by varying the ampere value of the energizing current being supplied to the magnet coils 85 and 86 through the train wire 14.

In causing the previously applied brakes to be graduated on, the increase in the energizing current for the magnet coils 85 and 86 produces a further closing force on bleed valve 59 which, in turn, causes an increase in the pressure of the control chambers 51 and 52. The increased pressure in the control chamber 51 now exceeds the brake cylinder pressure existing in the passage 42 and a resulting downward movement of the diaphragm 53 will open the valve 43 and cause the brake cylinder pressure to be increased. When the brake cylinder pressure increases to substantially the value of the pressure in the control chamber 51, the valve 43 is again closed by the spring 44.

In causing the previously applied brakes to be graduated off, the decrease in the energizing current for the magnet coils 85 and 86 produces a decreased closing force on the bleed valve 59 which, in turn, causes a decrease in the pressure of the control chambers 51 and 52. The decreased pressure of the control chamber 52 permits the valve 49 to be opened slightly by the relatively higher brake cylinder pressure in the passage 42 to allow some of the brake cylinder fluid to escape through the passage 31. When the brake cylinder pressure decreases to substantially the pressure in the control chamber 52, the valve 49 is reclosed to maintain the brake cylinder fluid at such desired lower pressure. The valve 49 will be reclosed under these circumstances because of the greater area of the diaphragm 54 upon which the control pressure acts in relation to the area on which the brake cylinder pressure is acting.

Whenever an electric application of the brakes is made, that is to say, whenever energizing current is supplied to the magnet coils 85 and 86 through the train wire 14, the pressure of brake pipe fluid which builds up in the bleed passage 57 by reason of the restricting or closing of the bleed valve 59, causes pressure to also build up in the diaphragm chamber 73 and shift the plunger 75 upwardly to cause opening of the normally closed electric switch 69. It should also be explained at this point that whenever a pneumatic application of the brakes is made by manipulation of the engineer's brake valve 23, some of the pressure fluid which is then supplied to the brake cylinder 20 by the control valve mechanism 19 flows through the passage 31 and into the control chamber 72 through the passage 76. The pressure thus supplied to the control chamber 72 causes the plunger 74 to be moved upwardly to close the normally open switch 68. The pressure which is supplied in this same manner to the control chamber 72 of the valve and switch unit 16 of the caboose 17 causes opening of the normally closed switch 124 which is located in the ground connection 26.

In releasing the brakes of the train after such an electric application thereof, the handle 138 of the current control device 24 is moved to its off position, thereby opening the switch 152 of the train wire switch device 148 and thus deenergizing the magnet coils 85 and 86 of the valve and switch units 10 and 16. The deenergization of the train wire circuit causes the deenergization of the relay 254 which permits the spring 258 to open the switch 257 and extinguish the pilot light 259. The deenergization of the magnet coils 85 and 86 permits opening of the bleed valves 59 of the units 10 and 16, thereby allowing the pressure in the control chambers 51 and 52 and in the control chamber 73 to be vented to atmosphere through the bleed valve orifice 84.

The release of pressure from the control chamber 51 permits the spring 44 to reclose the valve 43 to thereby discontinue the flow of pressure fluid from the emergency reservoir 22 to the brake cylinder 20. The release of pressure from the control chamber 52 permits reopening of the valve 49 by the action of brake cylinder pressure against the underside of the diaphragm member 54, thereby connecting the brake cylinder passage 29 with the inshot and timing valve apparatus of the control valve mechanism 19 through the passage 31 to permit venting of brake cylinder pressure to atmosphere through the appropriate valves and passages of this control valve mechanism which has remained in its release position throughout the electric application. The release of pressure from the control chamber 73 permits reclosing of the normally closed switch 69.

*Operation using light pneumatic service application in counting the number of train brakes in working condition*

One of the functions performed by the electromagnetic counting device 201 is to count the number of cars of the train which has brakes in working condition and which is important information for the train crew to have. In making this count, the brakes of the train are first applied pneumatically by manipulating the engineer's brake valve 23 so as to make a brake pipe pressure reduction of about 8 p.s.i. During this light pneumatic application, pressure fluid is supplied to the brake cylinders 20 at about 10 p.s.i. provided the brake cylinder piston travel due to wear or other defects is not excessive, from the inshot and timing valves of the AB control valve mechanisms 19 through the passages 31 of the valve and switch units 10 and 16 and this pressure will also flow into the control chambers 72 of these units through the passages 76. A pressure of about 8 p.s.i. in the control chambers 72 will be sufficient to cause closing of the normally open switches 68 and this will take place in response to the 8 p.s.i. brake pipe reduction, provided that the control valve mechanisms 19 are in working condition and the piston travel of the brake cylinders is not excessive. At the caboose the pressure of 8 p.s.i. in the control chamber 72 will cause opening of the normally closed switch 124.

The push button switch 250 is now pressed in by the engineer, whereupon the electromagnetic counter 201 will be operated through energizing circuits which will be presently explained to count the number of cars of the train on which the light pneumatic application has resulted in a proper functioning of the brake mechanisms. The closing of the push button switch 250 results in circuits being established, as explained in detail hereinafter, by which an electric application is produced in serial relation for all of the cars of the train and this electric application for car counting purposes is produced without requiring any actuation of the control valve handle 138. During this counting operation, the cars on which a pneumatic brake application has been made with a brake cylinder pressure of a minimum of 8 p.s.i. will send signal impulses in succession to the control unit 15 of the locomotive through the train wire 14. These signal impulses are generated by the magnet coils 85 and 86 in response to the sudden opening of the switches 69 by the serially produced electric applications, as has already been explained in a general way above, and cause operation of the electromagnetic counting device 201. If the brake on any car is not applied with a minimum pressure of 8 p.s.i., the switch 68 of that car will not be closed and a signal impulse will therefore not be produced by the opening of the switch 69 of that particular car. Those cars on which the switches 68 are not closed will be skipped and will not be included in the count shown by the counting device 201.

When the signal impulse producing sequence has traveled through the train to the car immediately ahead of the caboose, a final impulse is produced by that car and is recorded by the counting device 201 and, at substantially the same time, the train wire circuit is opened and the pilot light 259 is extinguished. If the pilot light 259 remains lighted after the electromagnetic counter 201 has given a final indication, it will signify that a short-circut exists in the train at a point which is at a distance from the locomotive corresponding with the number of cars shown by the counter. Since the location of the short-circuit is thus given in a definite manner, the train crew can readily locate and remedy the same.

When the counting operation following this light pneumatic application of the brakes is completed and such completion is indicated by the extinguishment of the pilot light 259, the engineer then notes the reading of the electromagnetic counter 201. If the reading of the counter corresponds with the total number of cars in the train it will indicate that all of the brakes of the train are in a working condition. If the reading of the counter is less than the total number of cars in the train the difference between the counter reading and the total number of cars will represent the number of cars of the train whose brakes are not in working condition and which representative number includes those cars whose brake cylinders have excessive air leakage due to faulty piston or rod packings and those cars whose brake cylinders have excessive piston travel due to wear or other defects.

*Operation in checking pneumatic functioning of brakes during full pneumatic service application*

In further checking the operativeness of the air brake mechanisms of the train, the engineer now makes a reduction calling for a full pneumatic service application. In making this check, the engineer manipulates the air brake 23 to a full service brake pipe reduction, thereby causing the control valve mechanisms 19 of the train to attempt to produce a full pneumatic service application for the brakes of all cars. All control valve mechanisms which are in working condition will respond to this call for a full service application, including those control valve mechanisms for which the previous light pneumatic service reduction may have been inadequate to cause them to operate. In the brake cylinders of all cars whose control valve mechanisms have responded to this full pneumatic service reduction, a brake cylinder pressure will be developed which will be greatly in excess of the above-mentioned 8 or 10 p.s.i. for the light pneumatic service application. This relatively greater brake cylinder pressure resulting from the full pneumatic service application will be developed in all brakes whose control valve mechanisms are in operating condition, including those brakes whose brake cylinders have excessive piston travel.

Immediately following such manipulation of the brake valve 23, the engineer presses the push button 250 of the switch 206 to cause the counter 201 to count the cars of the train on which a brake cylinder pressure of at least 8 p.s.i. has been developed and which count can be taken as an indication of the number of cars on which the brake mechanisms are in working condition, regardless of the extent of their actual piston travel. In making this count the pilot light 259 is lighted by the closing of the switch 257 and remains lighted until the count has been completed. When the pilot light goes out the engineer notes the reading of the counter 201 for this full pneumatic service application and by subtracting therefrom the count obtained from the light pneumatic service application described above, a difference will be had which can be taken as an indication of the number of brake mechanisms whose brake cylinders have excessive piston travel.

*Detailed operation of counting apparatus*

The functioning of the electromagnetic counter 201 in accomplishing a car counting function, such as the counting functions already referred to above, will now be explained. During such a counting function the counting device 201 is under the control of the electromagnetic relays 203 and 204 and also is under the control of the push button switch 206 for initiating the counting function. In initiating such a count the push button 250 is pressed in to close the switches 251 and 252. The closing of the switches 251 and 252 causes the relays 203 and 204 to be energized and the energization of these relays results in the electromagnetic counter 201 being first reset to its zero position and thereafter actuated to count the cars on which a desired test function of the brakes is being carried out.

When the relay energizing switches 251 and 252 of the push button switch 206 are closed, they permit current from the supply line conductor 128 to flow through the relay coil 229 of the relay 203 and then through the conductor 263, the switch 251, the conductor 264 and then through the conductor 265 to the coil 236 of the relay 204. This relay energizing circuit continues from the coil 236 through the conductor 266 through the switch 252 and then through the lower portion of the conductor 267 and through the conductor 268 back to the supply line conductor 129 through the switch 218 of the electromagnetic counter 201. As soon as this energizing circuit for the relays 203 and 204 is completed the switches 231 and 232 of the relay 203 are closed and, like-wise, the switches 239 and 240 of the relay 204 are closed. The energization of the relays 203 and 204 also causes opening of the switches 230 and 238 thereof.

The closing of the switch 232 of the relay 203 and the closing of the switch 240 of the relay 204 establishes a holding circuit for these relays which extends through the switch 218 of the electromagnetic counter 201 and will maintain these relays energized as long as the switch 218 remains closed. As is explained in greater detail hereinafter, the switch 218 controls the resetting of the digit wheels 207 of the counter 201 to zero and stops the rotation of the digit wheels so as to leave them reset at their zero position. Therefore, whenever the counter 201 is being reset and the digit wheel 207c moves to a zero position such that the cam wheel 222 causes opening of the switch 218, the relay 204 will be deenergized and the switches 239 and 240 thereof will be moved to their open position and the switch 238 will be moved to its closed position, by the spring 241.

As previously mentioned herein, the relay 204 is a quick-release relay and as soon as the coil 236 thereof is deenergized by the opening of the holding circuit which includes the switch 218, the switches 239 and 240 are opened and the switch 238 is closed. The relay 203, as mentioned above, is a slow-release relay having a time characteristic such that the switches 231 and 232 will remain closed for a short interval after the deenergization of the relay 204. The closing of the relay switch 238 while the switch 232 of the relay 203 remains closed establishes a new holding circuit for the relay 203 by which this relay is maintained energized after the relay 204 has been deenergized. This new holding circuit for the relay 203 is established through the train wire 14 and also constitutes the signal circuit through which the signal impulses are transmitted from the valve and switch units 10 to the control unit 15 of the locomotive, as will be further explained hereinafter. This holding circuit can be traced from the supply line conductor 128 through conductor 269, through the magnet coil 229 of the relay 203, through the switch 232, through conductor 270 and through the upper portion of the conductor 265, then through switch 238, and conductor 244 to the primary 242 of the transformer 205. From the transformer primary 242 this circuit extends through conductor 245 into the train wire 14.

The closing of the switch 231 of the relay 203 upon the energization of this relay in response to the actuation of the push button switch 206 causes current to be supplied to the filament 225 of the thermionic tube 202. This filament circuit can be traced from the supply line conductor 128 to the switch 231 through the conductor 271, from the switch 231 to the filament 225 through the conductor 272 and then back to the supply conductor 129 through the conductors 273 and 260b. The filament of the thermionic tube 202 will therefore be supplied with current as long as the switch 231 of the relay 203 remains closed.

The resetting of the electromagnetic counting device 201 to zero is accomplished by current supplied by the plate circuit of the thermionic tube 202 and controlled by the switches 216 and 217 of the counter. During this resetting operation, current in the plate circuit of the vacuum tube 202 is supplied to the magnet coil 210 of the counting device 201 through the switch 217. The intermittent closing and opening of the energizing circuit for the magnet 210 causes the digit wheels of the counter 201 to be driven through a counting cycle which will result in the cam wheel 222 opening the switch 218 to automatically terminate the resetting of the counter when the digit wheels are at a zero position.

The intermittent current flow in the plate circuit of the thermionic tube for energizing the magnet coil 210 of the counting device 201 is produced only when this tube has been fired by supplying a signal impulse to the control grid 227. These signal impulses for the resetting of the counter are supplied to the control grid 227 under the control of the switch 216. When the resetting operation of the counter 201 is started by the closing of the quick-release relay 204, the switch 239 of this relay is closed to thereby connect the control grid 227 with the supply line conductor 128. The control grid circuit for the counter resetting operation can be traced from the supply line conductor 128 through the conductor 274, then through the switch 239 of the relay 204, through the conductor 275, the switch 216, and then through the conductor 276 and the resistor 276a to the control grid 227.

Whenever the switch 216 is closed during the resetting operation a signal impulse will be supplied to the control grid 227 causing the thermionic tube 202 to fire, thereby producing a flow of current in the plate circuit for energizing the magnet coil 210 of the counter. The energization of this magnet coil causes the switches 216 and 217 to be opened in succession, as previously explained herein, followed by a reclosing of these switches in succession. The opening of the switch 216 deenergizes the control grid 227 of the tube so that this grid can be subsequently reenergized by the reclosing of the switch to produce another flow of energizing current in the plate circuit.

The plate circuit for causing such energization of the magnet coil 210 of the counting device 201 can be traced from the cathode 224 to the plate 226 within the tube 202, then through the conductor 277 and the switch 217 to the magnet coil 210. From this magnet coil this circuit continues through the conductor 278 and a portion of the conductor 260a to the supply line conductor 128. The cathode 224 is connected with the supply line conductor 129 through the conductors 279 and 273 and through a portion of the conductor 260b to complete the plate circuit.

In carrying out the car counting operation, including the counting operations already described above, the control unit 15 of the locomotive constitutes an electric current impulse responsive means to which the above-mentioned electric impulses are transmitted by the train wire 14 from the valve and switch units 10 of the respective cars of the train. As has already been indicated above in a general way, these signal impulses are generated by the magnet coils 85 and 86 of the valve and switch units upon the opening of the normally closed switches 69 of the ground connections 25. These signal impulses are supplied to the control grid 227 of the thermionic tube 202 through the transformer action of the transformer 205 to cause firing of the tube and resulting in a flow of current in the plate circuit which energizes the magnet coil 210 of the electromagnetic counter 201 to thereby cause actuation of the digit wheels of the counter. The switch 217 opens every time that the counter 201 is actuated by the magnet coil 210 thereof and, hence, interrupts the flow of current in the plate circuit to render the plate circuit current an intermittent current during the counting operation.

When a full pneumatic application of the brakes of the train has been called for by manipulation of the engineer's brake valve 23, as explained above, and the engineer wishes to count the number of cars on which such applications have been accomplished, he then presses the push button switch 206 to cause the counting operation to be performed. During the completion of the pneumatic application just made, the functioning of the valve and switch units 10 of the cars will cause the switches 68 to be closed by brake cylinder pressure being transmitted from the brake cylinder passage 31 through the connecting passage 76 to the diaphragm chamber 72. At the caboose this same brake cylinder pressure value effective in the diaphragm chamber 72 causes opening of the switch 124 to disable the ground connection 26.

Just prior to the actuation of the push button switch 206 the train wire circuit and the magnet coils 85 and 86 are deenergized because at this time the switch 152 of the train wire switch device 148, and the switches of the relays 203 and 204 controlling the energization of the train wire circuit, are all in an open position. The actuation of the push button switch 206 first results in the operation of the counter 201 under the control of the relays 204 and 203 to reset the counter to zero, as has already been explained above in detail. Upon the completion of the resetting operation the relay 204 assumes its open position shown in FIG. 21, but the slow-release relay 203 remains in its closed position by reason of the second holding circuit which is established through the switches 232 and 238. The energization of this holding circuit by the reclosing of the switch 238 of the relay 204 also establishes the signal circuit between the valve and switch units 10 and the locomotive control unit 15 and causes energization of the train wire 14 and of the magnet coil 85 of the first car preparatory to this magnet coil producing the above-mentioned electrical impulse for actuation of the counter 201.

When the train wire circuit is energized at this point of the counting operation, current flows from the supply line conductor 128 through the conductor 269, through magnet coil 229 of the relay 203, through the switch 232, the conductor 270, the switch 238 of the relay 204, then through conductor 244, the primary 242 of the transformer 205 and then through the conductor 245 to the train wire 14. This circuit continues through the magnet coil 255 of the relay 254 and then through the train wire 14 to the magnet coil 85 of the valve and switch unit 10 of the first car of the train. After traversing the magnet coil 85 of the first car, the train wire current passes through the brake cylinder pressure switch 68 which is closed at this time, and then through the normally closed switch 69 and the ground connection 25 to the common ground 18. From the common ground 18 the circuit is completed back to the supply line conductor 129 through the conductor 130 and the lamp 131.

The completion of this circuit through the magnet coil 85 of the first car causes closing of the bleed valve 59 which results in pressure being built up in the diaphragm chamber 73 to cause opening of the switch 69. The opening of this switch alters the energizing circuit for the magnet coil 85 by making the energizing current flow through the coil 86 of the first car and the coil 85 of the second car before it can reach the ground conductor 18 by way of the ground connection 25 of the second car. This added resistance in the energizing circuit for the coil 85 of the first car causes a substantial sudden decrease in the energizing current and the resulting self-induction effect of this coil thereupon produces an electrical impulse for the first car which flows back through the train wire 14, and through the primary 242 of the transformer 205, causing this impulse to be transmitted to the secondary 243 of the transformer and then through the conductor 246 to the control grid 227 of the thermionic tube 202. The delivery of this impulse to the control grid causes the thermionic tube to be fired to thereby produce a flow of current in the plate circuit for energizing the magnet coil 210 of the electromagnetic counter 201 which, as previously explained above, causes actuation of the digit wheel 207a to record the impulse from the first car of the train.

As soon as the switch 69 of the first car has opened to produce the first impulse it disables the ground connection 25 and thereafter the energizing current of the train wire circuit must travel rearwardly of the train through the magnet coil 86 of the first car and also through the magnet coil 85 of the second car before it reaches another one of the ground connections 25. Since the switches of the ground connection 25 of the second car are closed at this time, the train wire current will flow through these switches and the ground connection to the common ground 18 and in so doing will energize the magnet coil 85 of the second car to thereby produce opening of the normally closed switch 69 in the manner just explained above for the first car. The opening of the switch 69 of the second car causes another electric impulse to be generated by self-induction in the magnet coil 85 of such second car and carried by the train wire to the transformer 205 from which it is delivered to the control grid 227 of the vacuum tube 202 to again produce a flow of current in the plate circuit which energizes the magnet coil 210 of the electromagnetic counter 201, causing the digit wheel 207a to register the second car of the train as having brakes which have accomplished a full pneumatic application.

If the pneumatic application of the brakes has not been carried out on any car of the train the switch 68 thereof will not be closed and, hence, the current traversing the train wire during the counting operation will not be able to pass to the common ground 18 through the ground connection 25 of that particular car. When this condition exists the train wire current travels on to the next car in which the ground connection 25 has been completed by the closing of the switch 68. The car on which the ground circuit had not been completed by the satisfactory functioning of the pneumatic application will simply be skipped in the counting operation and only those cars will be counted on which the ground connections 25 have been completed.

When the train wire current reaches the caboose 17 it finds the switch 124 of the ground connection 26 to be open inasmuch as this switch was opened by the pneumatic application of the brakes of the caboose. Since the train wire circuit is then no longer completed through any ground connection of the train it will be deenergized and this will break the holding circuit by which the magnet coil 229 of the relay 203 is being energized and will permit the spring 234 of this relay to shift the switches 231 and 232 to their open position and close the switch 230. The opening of the switch 231 discontinues the supply of energizing current to the cathode heater 225 of the vacuum tube 202 and the opening of the switch 232 prevents any further signal impulse to be transmitted through the train wire circuit until a subsequent counting operation is started by actuation of the push button switch 206. Since both of the relays 203 and 204 are now deenergized and the vacuum tube 202 is also deenergized, the electromagnetic counter 201 will remain with the digit wheels thereof in the position indicating the highest count which has been produced by the signal impulses transmitted from the cars of the train. The reading of the counter 201 then indicates the number of cars on which the full pneumatic application of the brakes has been accomplished.

Operation in checking for leak-offs

The current control and car counting unit 15 of the locomotive can also be used in checking the brakes of the train for determining the number of cars on which the brakes are faulty by reason of the fact that the brake cylinders are incapable of holding the necessary pressure for maintaining the brakes in an applied condition. When brake cylinder pressure is lost through such leakage, the brakes of that particular car lose their holding power and a car in such condition is referred to as a "leak-off" car.

In checking the train to determine the number of such leak-offs, the engineer first makes a full pneumatic application by manipulation of the engineer's brake valve 23 and then counts the number of cars on which the brakes have been fully applied by actuation of the push button switch 206. The engineer then waits for the lapse of a suitable interval of time during which the leak-offs will take place and then again operates the push button switch 206 to cause another count to be made of the cars of the train on which the brakes are in the applied condition. The difference between the two counts given by the electromagnetic counter 201 will represent the number of cars on which leak-offs have occurred.

Operation in checking for stuck brakes

When the brakes of the train have been applied pneumatically and released pneumatically by manipulation of the engineer's brake valve 23, some of the brakes may fail to go to the released condition and the cars on which this occurs are referred to as having "stuck" brakes. It is important for the engineer to know whether any such cars with stuck brakes exist in the train and this can be determined by the current control and car counting unit 15.

In checking the train for the condition of stuck brakes the engineer first releases the previously made pneumatic application of the brakes and then by manipulation of the handle 138 of the current control device 24 makes a light electric application of the brakes. The engineer next makes a full pneumatic application of the brakes. The pneumatic release made by the engineer as the first step of this operation causes the switches 68 of the cars to be opened on all of the cars except those on which the brakes are stuck in the applied condition. The light electric application next made by the engineer causes the switches 69 of all of the cars, counting from the front end of the train up to but not including the car having the stuck brakes, to be opened and to remain open. The full pneumatic application then made by the engineer causes the switches 68 to be closed and the switch 124 of the caboose to be opened. If the pilot light 259 goes out upon the completion of the full pneumatic application it will indicate that there are no stuck brakes in the train.

The light electric application constituting a step of the procedure just outlined above is not sufficient to produce an electric application of the brakes on the car having only the coil 85 thereof energized, that is, on the car having stuck brakes. However, when the push button switch 206 is actuated to initiate the counting operation for locating a stuck brake as presently explained, a relatively heavy current is supplied to the train wire 14 and this heavier current produces a sufficient energization of the coil 85 of the car having the stuck brakes to result in an electric application of the brakes on this particular car and to also start the sequence of the counting operation.

If the brakes of any car of the train are stuck, the switch 68 of that car will have remained in the closed position, as well as the switch 69 thereof, and this will complete the ground connection through that particular car for the train wire circuit and the pilot light 259 will remain lighted. Assuming that the pilot light remains lighted, indicating the presence of one or more stuck brakes in the train, the engineer then presses the push button switch 206 to cause a count to be made of the cars of the train but the starting point for this count will be the first car having stuck brakes because this is the first car of the train on which the ground connection 25 will be closed. The count will continue through the remainder of the train from the car having the stuck brakes to the caboose and the indication then given by the counter 201 will show the location of the stuck brakes by indicating the number of cars ahead of the caboose at which this condition occurs. When the stuck brakes have been located, the train crew can remedy the same after which the engineer repeats the checking operation for stuck brakes until the current control and car counting unit 15 indicates that no stuck brakes exist in the train.

When any car counting operation is being carried out other than a count for stuck brakes, the handle 138 of the current control device 24 will be in its off position at which time the switch 155 of the switch device 148 will be closed, as shown in FIG. 15. Likewise, after the completion of the car counting operation the deenergization of the relay 203 permits the switch 230 thereof to be reclosed by the spring 234. The closing of the switch 230 establishes a circuit connection between the closed switch 155 and the supply line conductor 129 through the conductors 280 and 281. This causes the circuit for the train wire 14 to be completed to the locomotive through the magnet coils 189 of the bleed valve device 188 without passing through the push button switch 206 or the transformer 205.

*Control of electric application of brakes from caboose*

The train wire circuit can be controlled by a switch 282 of the caboose 17 for the purpose of initiating an electric application of the brakes of the train. By moving the switch member 282 into engagement with a contact 283 the train wire circuit will be supplied with energizing current from a battery 284 carried by the caboose and the ampere value of the energizing current then being supplied to the train wire circuit can be varied by a rheostat member 285. By thus moving the switch member 282a into engagement with the contact 283, the brakes of the train will be electrically applied by energization of the train wire circuit from the battery 284 and the force with which the brakes are applied can be varied by varying the ampere value of the energizing current by appropriate adjustment of the rheostat member 285. The brakes of the train can also be electrically released from the caboose by moving the switch member 282a out of engagement with the contact 283 to thereby deenergize the train wire circuit. Whenever the brakes of the train are being applied by manipulation of the control switch 282 of the caboose, the pilot lamp 259 will be lighted in the locomotive.

When the caboose 17 occupies a position at the rear end of the train the switch member 282a normally remains in engagement with a contact 287 of the ground connection 26 to permit control of the brakes from the locomotive in the manner already explained above. At this time the battery 284 is disconnected from the system at the point of the switch contact 283. The switch 282 also includes a dead contact 288 for use whenever the caboose is located at some intermediate point in the train. When the caboose is at such an intermediate point, the switch member 282a is shifted into engagement with the dead contact 288 such that the ground connection 26 will remain permanently open. In all counting operations then carried out on the train the caboose will not be counted because of the permanently open ground connection 26, but will be skipped during the passage of the train wire current from one to the other of the adjacent cars located on opposite sides of the caboose. The open ground connection 26 of the caboose 17 also permits an electric application of the brakes to be made on cars located to the rear of the caboose.

*Conclusion*

From the accompanying drawings and the foregoing detailed description it will now be readily understood that this invention provides novel apparatus for accomplishing an inspection and car counting function by which the operativeness of the brakes of the individual cars, and various other conditions, can be quickly and accurately ascertained, as well as the location in the train of any faulty brake mechanism.

It will now also be understood that this invention provides improved air brake apparatus in which electric signal impulse generating means located on the cars transmits signal impulses to a signal impulse responsive means located on the locomotive such that a car counting function can be carried out rapidly and substantially automatically for checking the operativeness of the brakes of the cars and various other conditions.

By the use of the car counting and inspection function, this novel apparatus enables the engineer to readily count the number of cars on which the brakes have been applied with a piston travel exceeding a specified maximum such as, for example, 10 inches. Moreover, when a full service pneumatic application of the brakes is made, the novel apparatus will enable the engineer to count the number of cars on which the brakes have been applied regardless of the extent of piston travel of the brake cylinders.

With the novel apparatus of this invention the engineer will also be readily able to count the number of cars on which leak-offs occur and to also determine whether there are any brakes remaining stuck after a release of the train brakes. When a stuck brake is shown to exist, the novel apparatus also indicates the position of the stuck brake and is also capable of indicating the existence of a short-circuit or open circuit condition of the train wire and to specify the position in the train of the train wire failure.

Having thus described our invention, we claim:

1. For use on a train of load vehicles having air brake devices connected by a brake pipe and pneumatically operable in a serial relation to a brake-applied condition and comprising, on each vehicle, a control valve mechanism of the triple-valve type and a pressure fluid responsive brake cylinder connected with said control valve mechanism; brake condition signalling apparatus comprising an electric train circuit including a source of energizing current and load circuit conductors connected therewith; electromagnets on said vehicles in a series circuit relation in said train circuit; said train circuit having parallel circuit portions on the respective vehicles and connected across said load conductors; switch means in said parallel circuit portions; fluid pressure responsive means on said vehicles and responsive to a predetermined brake cylinder pressure for closing said switch means; energization control means connected with said train circuit for causing energization of said electromagnets and the parallel circuit portions of those certain vehicles whose switch means have been closed in response to the occurrence of said predetermined pressure in the brake cylinders thereof; means on said vehicles responsive to the energization of said electromagnets for causing actuation of said switch means to an open condition to thereby vary the energization of the electromagnets of said certain vehicles to serially produce, by electromagnetic induction, electric signal impulses in said train circuit; and electric signal impulse responsive counting means connected with said train circuit and actuatable by said signal impulses for counting said certain vehicles.

2. Air brake condition signalling apparatus for use on a train of air brake equipped vehicles as defined in claim 1 wherein said electromagnets comprise a pair of series magnet coils on each vehicle; and wherein the parallel circuit portions of the respective vehicles are connected with a load conductor of said train circuit at junction points between the magnet coils of such pairs of coils.

3. Air brake condition signalling apparatus for use on a train of air brake equipped vehicles as defined in claim 1 wherein said train is connected with a control vehicle and said energization control means is manually operable; said energization control means and said counting means being located on said control vehicle.

4. Air brake condition signalling apparatus for use on a train of air brake equipped vehicles as defined in claim 1 wherein said switch means comprises a pair of switches on each vehicle in a series circuit relation in the parallel circuit portion of the vehicle; one of said switches being a normally-open switch closable by said fluid pressure responsive means and the other being a normally-closed switch; and other fluid pressure actuatable means on each vehicle and operable in response to the energization of the associated electromagnet for causing opening of said normally closed switch.

5. For use on a train of load vehicles having air brake devices connected by a brake pipe and pneumatically operable in a serial relation to a brake-applied condition and comprising, on each vehicle, a control valve mechanism of the triple-valve type and a pressure fluid responsive brake cylinder connected with said control valve mechanism; brake condition signalling apparatus comprising an electric train circuit including a source of energizing current and load circuit conductors connected therewith; electromagnets on said vehicles in a series circuit relation in one of the load conductors of said train circuit; said train circuit having parallel circuit portions on the respective vehicles and connected across said load conductors; first and second fluid pressure responsive switch devices on said vehicles and having control contacts in a series circuit relation in said parallel circuit portions; said first switch device being connected with said brake cylinder and its contacts being normally open but closable in response to a predetermined pressure value in said brake cylinder; said second switch device being connected with said brake pipe and its contacts being normally closed but openable in response to brake pipe fluid supplied to said second switch device; energization control means connected with said train circuit and manually operable to cause energization of said electromagnets and the parallel circuit portions of those certain vehicles whose first switch device contacts have been closed in response to the occurrence of said predetermined pressure value in the brake cylinders thereof; valve means on said vehicles responsive to energization of said electromagnets for causing the second switch device to be actuated by brake pipe fluid supplied thereto for serially opening the normally closed switch contacts of said vehicles; the energization of said electromagnets being subject to change by the opening of said normally closed switch contacts for causing said electromagnets to serially produce, by electromagnetic induction, electric signal impulses in said train circuit; and electric signal impulse responsive counting means connected with said train circuit and actuatable by said signal impulses for counting said certain vehicles.

6. Air brake condition signalling apparatus for use on a train of air brake equipped vehicles as defined in claim 5 wherein said valve means comprising normally-open bleed passage means leading to atmosphere from said second switch device, and a valve member controlling said bleed passage means and actuatable to close the same in response to the energization of the electromagnet associated with said second switch device.

7. Air brake condition signalling apparatus for use on a train of air brake equipped vehicles as defined in claim 5 and comprising adapter housings adapted for attachment to the control valve mechanisms in fluid communicating relation with passages of the latter; said electromagnets, said first and second switch devices and said bleed valve means being located in said adapter housings.

8. For use on a train of load vehicles having pneumatic air brake devices connected by a brake pipe and pneumatically operable in a serial relation to a brake-applied condition and comprising, on each vehicle, a control valve mechanism of the triple-valve type and a pressure fluid responsive brake cylinder connected with said control valve mechanism; brake control and condition signalling apparatus comprising an electric train circuit including a source of energizing current and load circuit conductors connected therewith; housings on said vehicles having passages connected with passages of the control valve mechanisms including a brake pipe fluid passage, a pressure fluid supply passage, and brake cylinder supply and exhaust passages; electromagnets in said housing in a series circuit relation in one of the load conductors of said train circuit; said train circuit having parallel circuit portions on the respective vehicles and connected across said load conductors; first and second fluid pressure responsive switch devices in said housings and having control contacts in a series circuit relation in said parallel circuit portions; said first switch device being connected with said brake cylinder through one of said brake cylinder passages and its contacts being normally open but closable in response to a predetermined fluid pressure value in said brake cylinder; said second switch device being connected with said brake pipe passage and its contacts being normally closed but openable in response to brake pipe fluid supplied to said second switch device; energization control means connected with said train circuit and manually operable to cause energization of said electromagnets and the parallel circuit portions of those certain vehicles whose first switch device contacts have been closed in response to the occurrence of said predetermined pressure value in the brake cylinders thereof; valve means in said housings and responsive to energization of said electromagnets for causing the second switch device to be actuated by brake pipe fluid supplied thereto for serially opening the normally closed switch contacts of said vehicles; the energization of said electromagnets being subject to change by the opening of said normally closed switch contacts for causing said electromagnets to serially produce, by electromagnetic induction, electric signal impulses in said train circuit; and electric signal impulse responsive counting means connected with said train circuit and actuatable by said signal impulses for counting said certain vehicles.

9. Air brake control and condition signalling apparatus for use on a train of air brake equipped vehicles as defined in claim 8 wherein said valve means comprises normally-open bleed passage means leading to atmosphere from said second switch device, and a valve member controlling said bleed passage means and actuatable to close the same in response to the energization of the electromagnet associated with said second switch device; said apparatus also comprising brake application and release valves in said housings for controlling the supply of pressure fluid to, and the exhaust of fluid from, the brake cylinders; and other pressure fluid responsive means in said housings and connected with the brake pipe fluid passages thereof for causing actuation of said application and release valves in response to the supply of brake pipe fluid to said second switch device and the actuation of the bleed passage valve member by said associated electromagnet.

References Cited in the file of this patent

UNITED STATES PATENTS

| | | |
|---|---|---|
| 1,568,041 | Beshears | Jan. 5, 1926 |
| 2,464,978 | Hines | Mar. 22, 1949 |
| 2,605,329 | Hines | July 29, 1952 |
| 2,799,846 | Negrin | July 16, 1957 |
| 2,802,935 | Swander et al. | Aug. 13, 1957 |